United States Patent
Kim et al.

(10) Patent No.: US 11,006,365 B2
(45) Date of Patent: May 11, 2021

(54) METHOD FOR TRANSMITTING OR RECEIVING WAKE-UP RADIO PACKET IN WIRELESS LAN SYSTEM AND APPARATUS THEREFOR

(71) Applicant: LG ELECTRONICS INC., Seoul (KR)

(72) Inventors: Jeongki Kim, Seoul (KR); Kiseon Ryu, Seoul (KR); Suhwook Kim, Seoul (KR); Hyunhee Park, Seoul (KR); Hangyu Cho, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 2 days.

(21) Appl. No.: 16/464,661

(22) PCT Filed: Nov. 27, 2017

(86) PCT No.: PCT/KR2017/013604
§ 371 (c)(1),
(2) Date: May 28, 2019

(87) PCT Pub. No.: WO2018/097679
PCT Pub. Date: May 31, 2018

(65) Prior Publication Data
US 2019/0349857 A1    Nov. 14, 2019

Related U.S. Application Data

(60) Provisional application No. 62/426,609, filed on Nov. 28, 2016, provisional application No. 62/431,832,
(Continued)

(51) Int. Cl.
*H04W 52/02* (2009.01)
*H04W 76/11* (2018.01)
(Continued)

(52) U.S. Cl.
CPC ........ *H04W 52/0229* (2013.01); *H04W 76/11* (2018.02); *H04W 80/02* (2013.01); *H04W 84/12* (2013.01)

(58) Field of Classification Search
CPC . H04W 52/0229; H04W 74/08; H04W 76/11; H04W 80/02; H04W 84/12;
(Continued)

(56) References Cited

U.S. PATENT DOCUMENTS

2014/0029532 A1*  1/2014  Han ..................... H04L 1/1861
                                                               370/329
2014/0071873 A1*  3/2014  Wang ................. H04W 72/1284
                                                               370/311

(Continued)

FOREIGN PATENT DOCUMENTS

WO         2014121016         8/2014

OTHER PUBLICATIONS

PCT International Application No. PCT/KR2017/013604, Written Opinion of the International Searching Authority dated Mar. 6, 2018, 16 pages.

*Primary Examiner* — Phirin Sam
*Assistant Examiner* — Louis Samara
(74) *Attorney, Agent, or Firm* — Lee, Hong, Degerman, Kang & Waimey PC

(57) ABSTRACT

A method for transmitting, by an access point (AP), a wake-up radio (WUR) packet in a wireless local area network (WLAN) system, according to an embodiment of the present invention, comprises the steps of: setting a MAC header comprising at least two of type information of the WUR packet, receiver address information, and transmitter address information; and transmitting the WUR packet comprising the MAC header, wherein in setting the MAC header, when the WUR packet is a broadcast WUR packet,
(Continued)

the AP omits the receiver address information from the MAC header and sets the transmitter address information, and wherein whether or not an STA belonging to the AP should perform a primary connectivity radio (PCR)-on procedure after receiving the broadcast WUR packet may be instructed through the type information of the WUR packet.

15 Claims, 23 Drawing Sheets

Related U.S. Application Data filed on Dec. 9, 2016, provisional application No. 62/490,639, filed on Apr. 27, 2017, provisional application No. 62/522,744, filed on Jun. 21, 2017.

(51) Int. Cl.
*H04W 80/02* (2009.01)
*H04W 84/12* (2009.01)

(58) Field of Classification Search
CPC .......... H04W 68/025; H04W 72/1284; H04W 56/00; H04W 72/0413
See application file for complete search history.

(56) References Cited

U.S. PATENT DOCUMENTS

| | | | |
|---|---|---|---|
| 2014/0204822 A1* | 7/2014 | Park | H04W 68/025 370/311 |
| 2015/0012761 A1 | 1/2015 | Li et al. | |
| 2015/0334650 A1* | 11/2015 | Park | H04W 52/0209 370/311 |
| 2016/0021612 A1* | 1/2016 | Matsunaga | H04W 56/00 370/311 |
| 2018/0077708 A1* | 3/2018 | Lepp | H04W 72/0413 |

* cited by examiner

METHOD FOR TRANSMITTING OR RECEIVING WAKE-UP RADIO PACKET IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2017/013604, filed on Nov. 27, 2017, which claims the benefit of U.S. Provisional Application No. 62/426,609, filed on Nov. 28, 2016, 62/431,832, filed on Dec. 9, 2016, 62/490,639, filed on Apr. 27, 2017, and 62/522,744, filed on Jun. 21, 2017, the contents of which are hereby incorporated by reference herein in their entirety.

TECHNICAL FIELD

The present invention relates to a wireless local area network system and, more particularly, to a method of transmitting or receiving a Wake-Up Radio (WUR) packet through a WUR to wake a Primary Connectivity Radio (PCR) and an apparatus therefor.

BACKGROUND ART

Standards for Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DESCRIPTION OF THE INVENTION

Technical Problems

It is a technical object of the present invention to provide a method of more accurately and efficiently transmitting or receiving a WUR packet including a MAC header and an apparatus therefor.

The present invention is not limited to the above technical problems and other technical objects may be inferred from embodiments of the present invention.

Technical Solutions

According to an aspect of the present invention, provided herein is a method of transmitting a Wake-Up Radio (WUR) packet by an Access Point (AP) in a Wireless Local Area Network (WLAN) system, including configuring a Media Access Control (MAC) header including at least two or more of type information, receiver address information, or transmitter address information of the WUR packet; and transmitting the WUR packet including the MAC header, wherein, if the WUR packet is a broadcast WUR packet, the AP omits the receiver address information from the MAC header and configures the transmitter address information, upon configuring the MAC header, and whether a station (STA) belonging to the AP should perform a Primary Connectivity Radio (PCR)-on procedure after receiving the broadcast WUR packet is indicated by the type information of the WUR packet.

According to another aspect of the present invention, provided herein is an Access Point (AP) for transmitting a Wake-Up Radio (WUR) packet, including a processor for configuring a Media Access Control (MAC) header including at least two or more of type information, receiver address information, or transmitter address information of the WUR packet; and a transmitter for transmitting the WUR packet including the MAC header according to control of the processor, wherein, if the WUR packet is a broadcast WUR packet, the processor omits the receiver address information from the MAC header and configures the transmitter address information, upon configuring the MAC header, and whether a station (STA) belonging to the AP should perform a Primary Connectivity Radio (PCR)-on procedure after receiving the broadcast WUR packet is indicated by the type information of the WUR packet.

According to another aspect of the present invention, provided herein is a method of receiving a Wake-Up Radio (WUR) packet by a station (STA) in a Wireless Local Area Network (WLAN) system, including receiving the WUR packet including a Media Access Control (MAC) header; and acquiring at least two or more of type information, receiver address information, or transmitter address information of the WUR packet from the MAC header, wherein, if the WUR packet is a broadcast WUR packet, the transmitter address information except for the receiver address information is acquired from the MAC header, and whether the STA should perform a Primary Connectivity Radio (PCR)-on procedure after receiving the broadcast WUR packet is indicated by the type information of the WUR packet.

According to another aspect of the present invention, provided herein is a station (STA) for receiving a Wake-Up Radio (WUR) packet, including a receiver for receiving the WUR packet including a Media Access Control (MAC) header; and a processor for acquiring at least two or more of type information, receiver address information, or transmitter address information of the WUR packet from the MAC header, wherein, if the WUR packet is a broadcast WUR packet, the transmitter address information except for the receiver address information is acquired from the MAC header, and whether the STA should perform a Primary Connectivity Radio (PCR)-on procedure after receiving the broadcast WUR packet is indicated by the type information of the WUR packet.

If the WUR packet is a unicast WUR packet, the receiver address information configured as a WUR identifier (ID) of a corresponding STA may be included in the MAC header. If the WUR packet is a multicast WUR packet, the receiver address information configured as a Group ID (GID) of a corresponding STA group may be included in the MAC header.

The transmitter address information may be omitted from the MAC header and the transmitter address information omitted from the MAC header may be indicated by another part of the WUR packet. The WUR packet may further include at least one of a WUR preamble, a frame body, or a Frame Check Sequence (FCS).

If the type information of the WUR packet indicates that an STA should perform a Primary Connectivity Radio (PCR)-on procedure after receiving the broadcast WUR packet, the MAC header may further include information about an end time of the PCR-on procedure.

If the AP desires to transmit a group addressed frame through a Primary Connectivity Radio (PCR), the GID of the STA group may be configured as the receiver address information of the MAC header.

The AP may transmit a trigger frame or a group addressed frame through a Primary Connectivity Radio (PCR) after the end time of the PCR-on procedure indicated through the MAC header of the WUR packet.

The STA may determine a start time of the PCR-on procedure based on the end time of the PCR-on procedure indicated through the MAC header of the WUR packet.

Advantageous Effects

According to an embodiment of the present invention, a WUR packet may be more efficiently and accurately transmitted or received by configuring a MAC header in consideration of a type and a transmission scheme of a WUR packet.

Other technical effects in addition to the above-described effects may be inferred from embodiments of the present invention.

BEST MODE FOR CARRYING OUT THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described before, the following description is given of a method and apparatus for increasing a spatial reuse rate in a Wireless Local Area Network (WLAN) system. To do so, a WLAN system to which the present invention is applied will first be described in detail.

Figure 1:
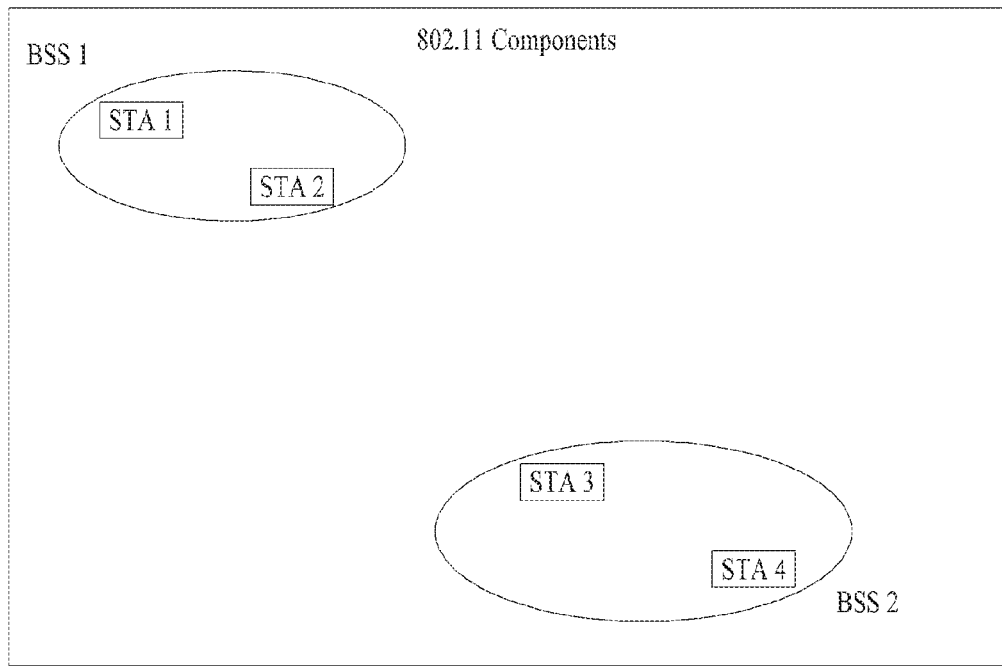
FIG. 1 illustrates an example of a configuration of a wireless LAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/ Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
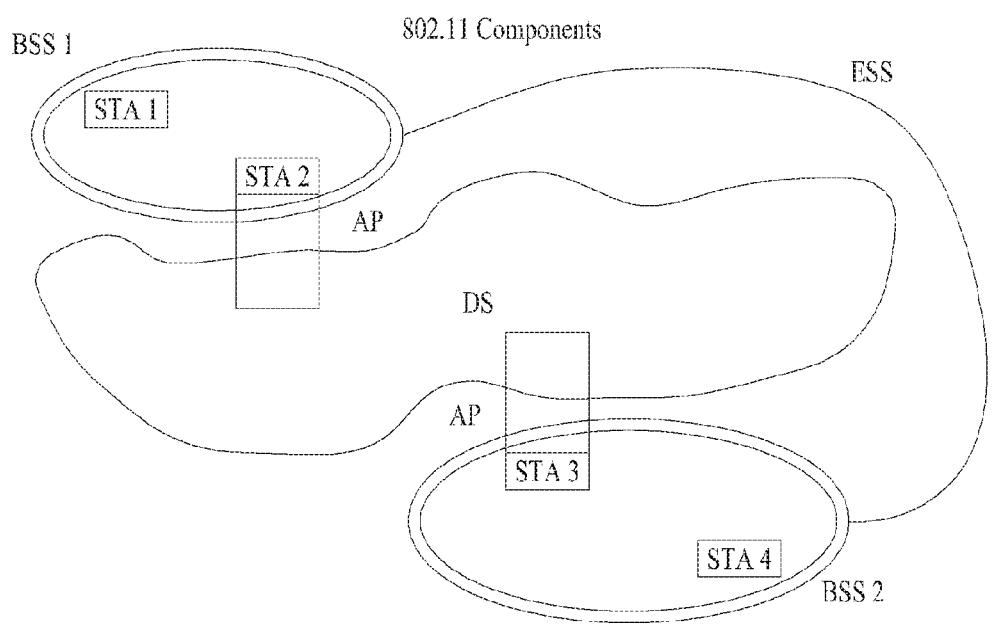
FIG. 2 illustrates another example of a configuration of a wireless LAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Architecture

An operation of an STA in a WLAN system may be described from the perspective of a layer architecture. A processor may implement the layer architecture in terms of device configuration. The STA may have a plurality of layers. For example, the 802.11 standards mainly deal with a MAC sublayer and a PHY layer on a Data Link Layer (DLL). The PHY layer may include a Physical Layer Convergence Protocol (PLCP) entity, a Physical Medium Dependent (PMD) entity, and the like. Each of the MAC sublayer and the PHY layer conceptually includes management entities called MAC sublayer Management Entity (MLME) and Physical Layer Management Entity (PLME). These entities provide layer management service interfaces through which a layer management function is executed.

To provide a correct MAC operation, a Station Management Entity (SME) resides in each STA. The SME is a layer independent entity which may be perceived as being present in a separate management plane or as being off to the side. While specific functions of the SME are not described in detail herein, the SME may be responsible for collecting layer-dependent states from various Layer Management Entities (LMEs) and setting layer-specific parameters to similar values. The SME may execute these functions and implement a standard management protocol on behalf of general system management entities.

The above-described entities interact with one another in various manners. For example, the entities may interact with one another by exchanging GET/SET primitives between them. A primitive refers to a set of elements or parameters related to a specific purpose. An XX-GET.request primitive is used to request a predetermined MIB attribute value (management information-based attribute information). An XX-GET.confirm primitive is used to return an appropriate MIB attribute information value when the Status field indicates "Success" and to return an error indication in the Status field when the Status field does not indicate "Success". An XX-SET.request primitive is used to request setting of an indicated MIB attribute to a predetermined value. When the MIB attribute indicates a specific operation, the MIB attribute requests the specific operation to be performed. An XX-SET.confirm primitive is used to confirm that the indicated MIB attribute has been set to a requested value when the Status field indicates "Success" and to return an error condition in the Status field when the Status field does not indicate "Success". When the MIB attribute indicates a specific operation, it confirms that the operation has been performed.

Also, the MLME and the SME may exchange various MLME_GET/SET primitives through an MLME Service Access Point (MLME_SAP). In addition, various PLME_GET/SET primitives may be exchanged between the PLME and the SME through a PLME_SAP, and exchanged between the MLME and the PLME through an MLME-PLME_SAP.

Link Setup Process

Figure 3:
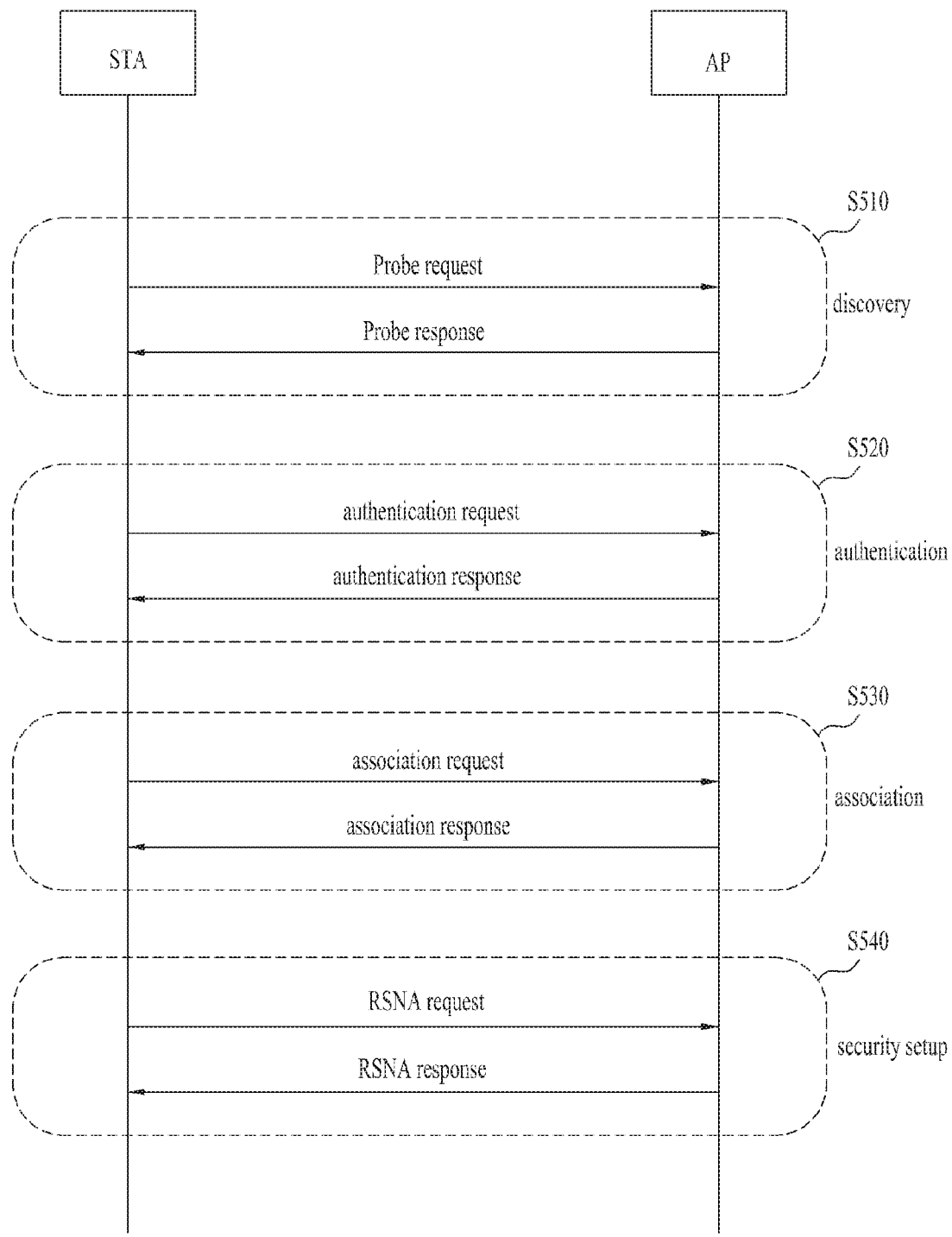
FIG. 3 illustrates a general link setup procedure.

FIG. 3 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 3.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 3 is a flowchart illustrating a network discovery action including an active scanning process. In the case of the active scanning, an STA configured to perform scanning transmits a probe request frame and waits for a response to the probe request frame, such that the STA can move between channels and at the same time can determine which Access Point (AP) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 3, the scanning action may also be carried out using passive scanning. An STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a Quality of Service (QoS) map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an Extensible Authentication Protocol over LAN (EAPOL) frame. In addition, the security setup process may also be carried out according to other security schemes not defined in IEEE 802.11 standards.

Medium Access Mechanism

In the IEEE 802.11—based WLAN system, a basic access mechanism of Medium Access Control (MAC) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 4:
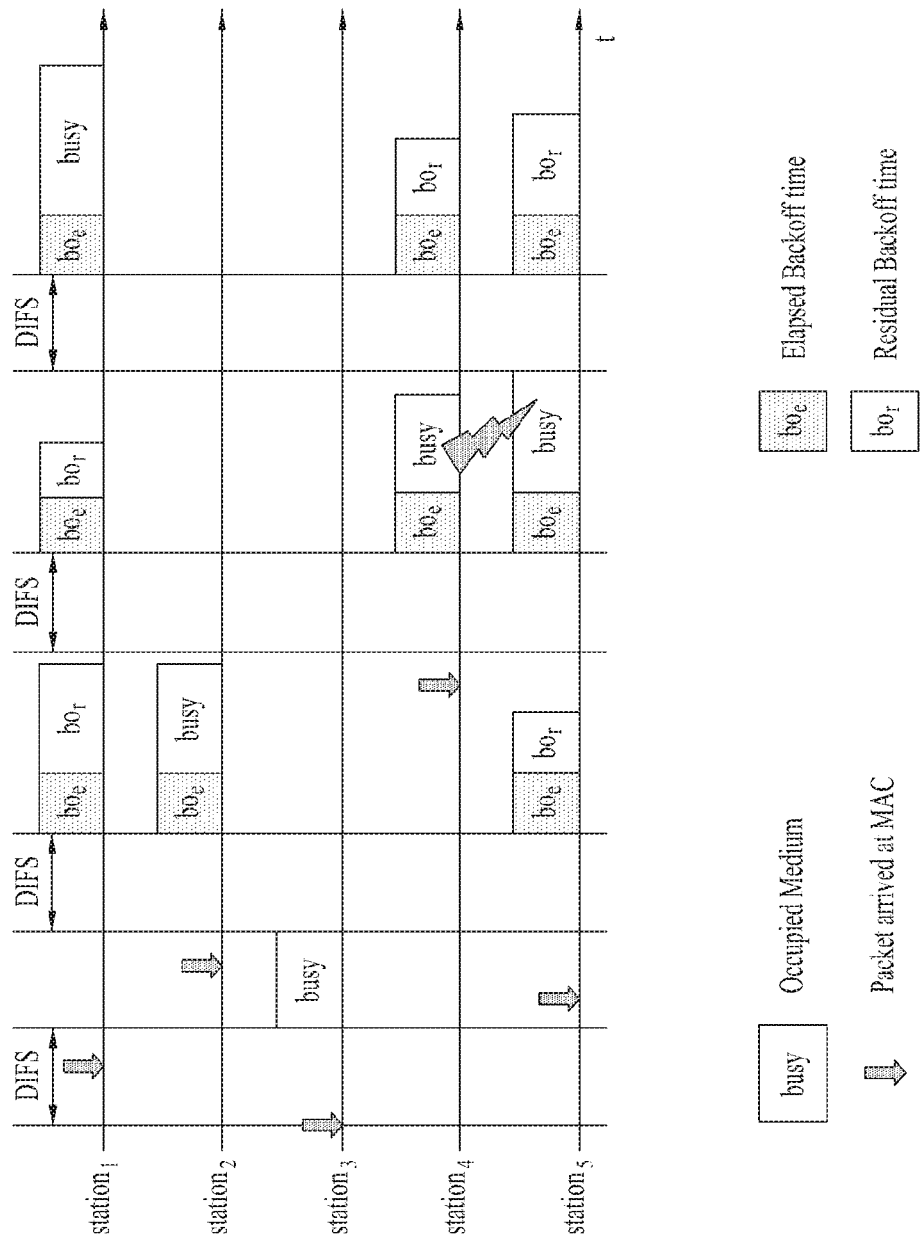
FIG. 4 illustrates a backoff procedure.

FIG. 4 is a conceptual diagram illustrating a backoff process.

Operations based on a random backoff period will hereinafter be described with reference to FIG. 4. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a Packet Number (PN), and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 4, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 4 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 4 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. An STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 5:
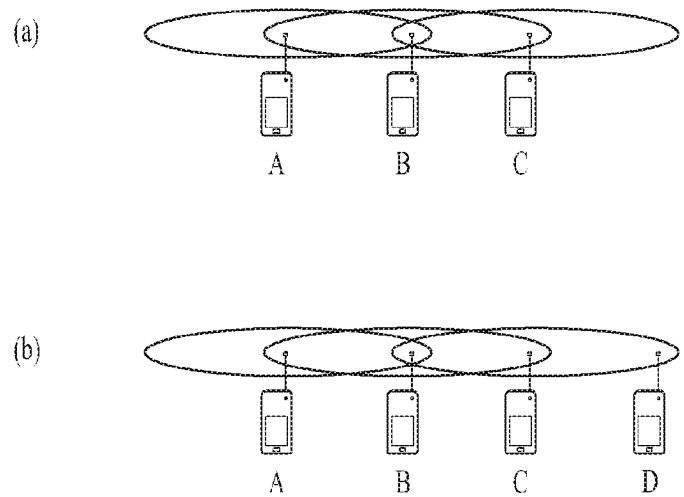
FIG. 5 is an explanatory diagram of a hidden node and an exposed node.

FIG. 5 is a conceptual diagram illustrating a hidden node and an exposed node.

FIG. 5(a) exemplarily shows the hidden node. In FIG. 5(a), STA A communicates with STA B, and STA C has information to be transmitted. In FIG. 5(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 5(b) exemplarily shows an exposed node. In FIG. 5(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 6:
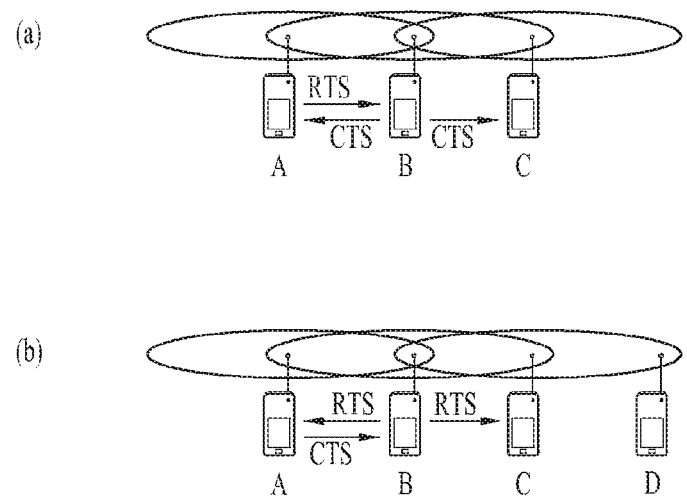
FIG. 6 is an explanatory diagram of RTS and CTS.

FIG. 6 is a conceptual diagram illustrating Request To Send (RTS) and Clear To Send (CTS).

In order to efficiently utilize the collision avoidance mechanism under the above-mentioned situation of FIG. 5, it is possible to use a short signaling packet such as RTS and CTS. RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 6(a) exemplarily shows the method for solving problems of the hidden node. In FIG. 6(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 6(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the Reception (Rx) state and the Transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a Power Management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

The AP may transmit a beacon frame to STAs in a BSS at predetermined intervals. The beacon frame may include a traffic indication map (TIM) information element. The TIM information element may include information indicating that the AP has buffered traffic for STAs associated therewith and will transmit frames. TIM elements include a TIM used to indicate a unicast frame and a delivery traffic indication map (DTIM) used to indicate a multicast or broadcast frame.

Figure 7:
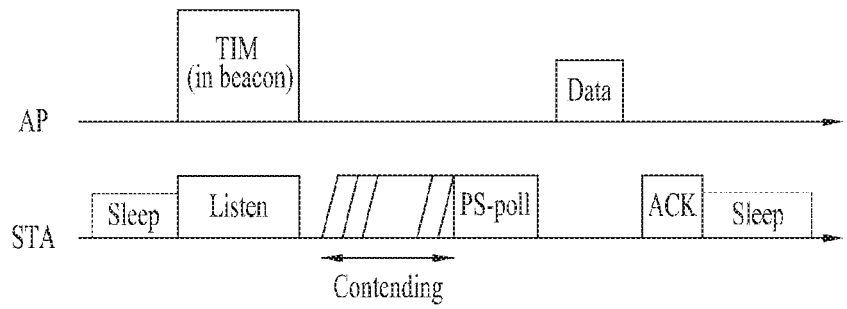
FIGS. 7 to 9 are explanatory diagrams of operation of an STA that has received TIM.
Figure 8:
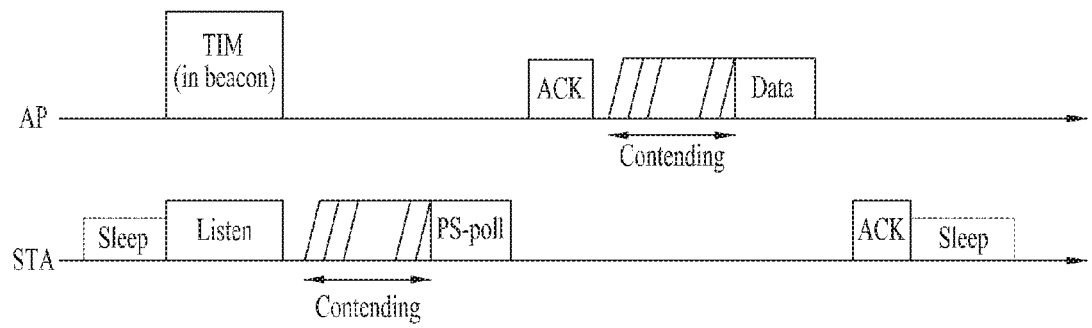
Figure 9:
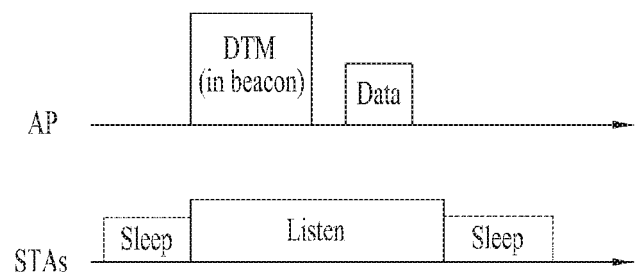

FIGS. 7 to 9 are conceptual diagrams illustrating detailed operations of the STA having received a Traffic Indication Map (TIM).

Referring to FIG. 7, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 7, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 8.

The STA operations of FIG. 8 in which the STA is switched from the sleep state to the awake state, receives a TIM from the AP, and transmits the PS-Poll frame to the AP through contention are identical to those of FIG. 7. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 9 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

Frame Structure

Figure 10:
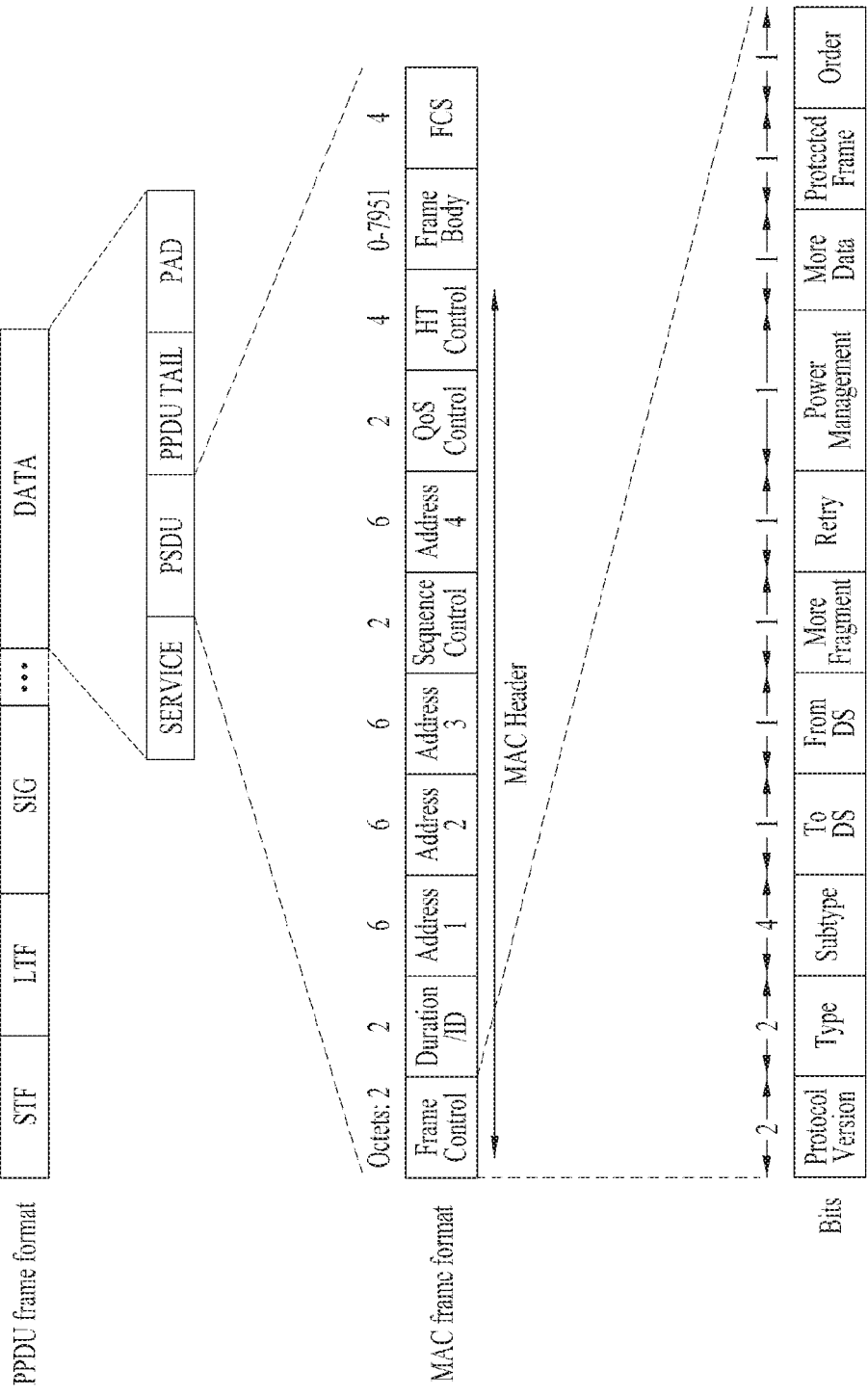
FIG. 10 is an explanatory diagram of an exemplary frame structure used in an IEEE 802.11 system.

FIG. 10 is an explanatory diagram of an exemplary frame structure used in an IEEE 802.11 system.

A PPDU (Physical Layer Protocol Data Unit) frame format may include an STF (Short Training Field), an LTF (Long Training Field), a SIG (SIGNAL) field and a data field. The most basic (e.g., non-HT (High Throughput)) PPDU frame format may include only an L-STF (Legacy-STF), an L-LTF (Legacy-LTF), a SIG field and a data field.

The STF is a signal for signal detection, AGC (Automatic Gain Control), diversity selection, accurate time synchronization, etc., and the LTF is a signal for channel estimation, frequency error estimation, etc. The STF and LTF may be collectively called a PLCP preamble. The PLCP preamble may be regarded as a signal for OFDM physical layer synchronization and channel estimation.

The SIG field may include a RATE field and a LENGTH field. The RATE field may include information about modulation and coding rates of data. The LENGTH field may include information about the length of data. In addition, the SIG field may include a parity bit, a SIG TAIL bit, etc.

The data field may include a SERVICE field, a PSDU (Physical layer Service Data Unit) and a PPDU TAIL bit. The data field may also include padding bits as necessary. Some bits of the SERVICE field may be used for synchronization of a descrambler at a receiving end. The PSDU corresponds to an MPDU (MAC Protocol Data Unit) defined in the MAC layer and may include data generated/used in a higher layer. The PPDU TAIL bit may be used to return an encoder to state 0. The padding bits may be used to adjust the length of the data field to a predetermined unit.

The MPDU is defined depending on various MAC frame formats, and a basic MAC frame includes a MAC header, a frame body and an FCS (Frame Check Sequence). The MAC frame may be composed of the MPDU and transmitted/received through PSDU of a data part of the PPDU frame format.

The MAC header includes a frame control field, a duration/ID field, an address field, etc. The frame control field may include control information necessary for frame transmission/reception. The duration/ID field may be set to a time to transmit a relevant a relevant frame.

The duration/ID field included in the MAC header may be set to a 16-bit length (e.g., B0 to B15). Content included in the duration/ID field may depend on frame type and subtype, whether transmission is performed for a CFP (contention free period), QoS capability of a transmission STA and the like. (i) In a control frame corresponding to a sub-type of PS-Poll, the duration/ID field may include the AID of the transmission STA (e.g., through 14 LSBs) and 2 MSBs may be set to 1. (ii) In frames transmitted by a PC (point coordinator) or a non-QoS STA for a CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined per frame type. For example, B15=0 of the duration/ID field indicates that the duration/ID field is used to indicate a TXOP duration, and B0 to B14 may be used to indicate an actual TXOP duration. The actual TXOP duration indicated by B0 to B14 may be one of 0 to 32767 and the unit thereof may be microseconds (μs). However, when the duration/ID field indicates a fixed TXOP duration value (e.g., 32768), B15 can be set to 1 and B0 to B14 can be set to 0. When B14=1 and B15=1, the duration/ID field is used to indicate an AID, and B0 to B13 indicate one AID of 1 to 2007. Refer to the IEEE 802.11 standard document for details of Sequence Control, QoS Control, and HT Control subfields of the MAC header.

The frame control field of the MAC header may include Protocol Version, Type, Subtype, To DS, From DS, More Fragment, Retry, Power Management, More Data, Protected Frame and Order subfields. Refer to the IEEE 802.11 standard document for contents of the subfields of the frame control field.

WUR (Wake-Up Radio)

First, a general description of a Wake-Up Radio Receiver (WURx), which is compatible with a WLAN system (e.g., 802.11), will now be given with reference to FIG. 11.

Figure 11:
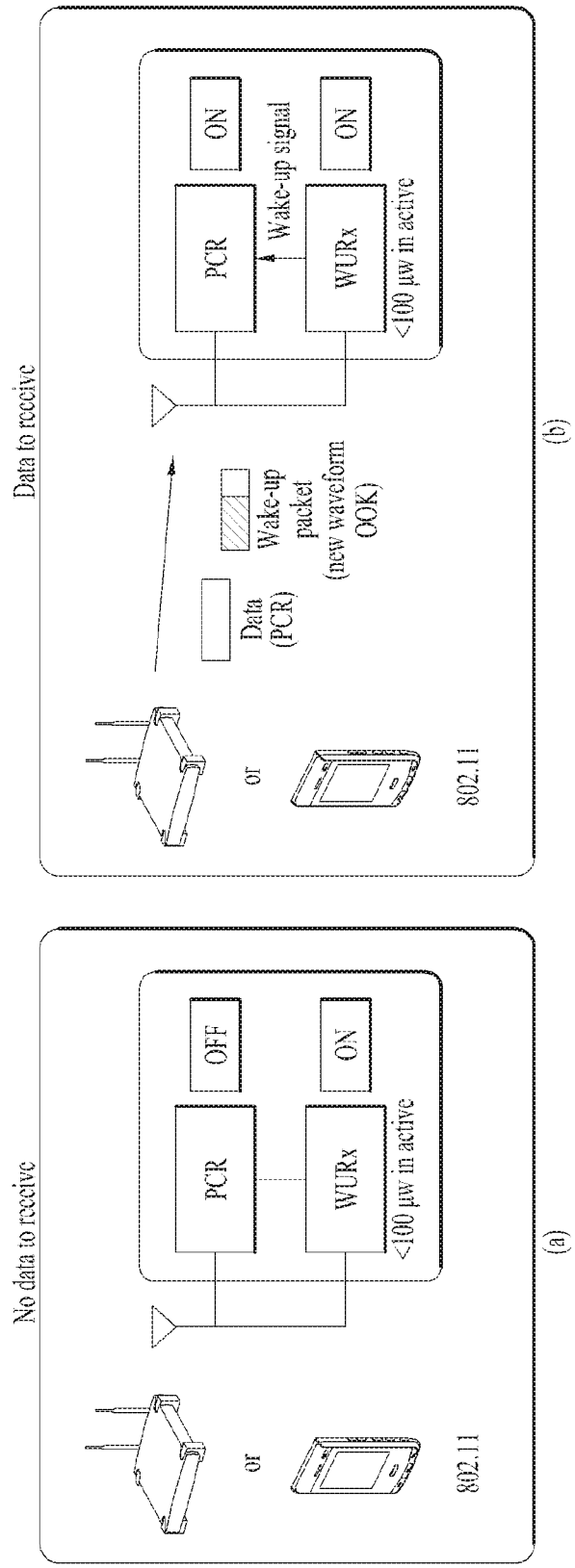
FIG. 11 is an explanatory diagram of a WUR receiver usable in a WLAN system (e.g., 802.11).

Referring to FIG. 11, an STA may support a Primary Connectivity Radio (PCR) (e.g., IEEE 802.11a/b/g/n/ac/ax WLAN), which is used for main wireless communication, and a Wake-Up Radio (WUR) (e.g., IEEE 802.11ba).

The PCR is used for data transmission and reception and may be turned off when there is no data to be transmitted and received. In the case in which the PCR is turned off, if there is a packet to be received, a WURx of the STA may wake the PCR. Therefore, user data is transmitted through the PCR.

The WURx may not be used for user data and may function only to wake a PCR transceiver. The WURx may be a simple type of receiver without a transmitter and is activated while the PCR is turned off. In an active state, target power consumption of the WURx desirably does not exceed 100 microwatts (μW). To operate at such low power, a simple modulation scheme, for example, On-Off Keying (OOK), may be used and a narrow bandwidth (e.g., 4 MHz or 5 MHz) may be used. A reception range (e.g., distance) aimed by the WURx may conform to current 802.11.

Figure 12:
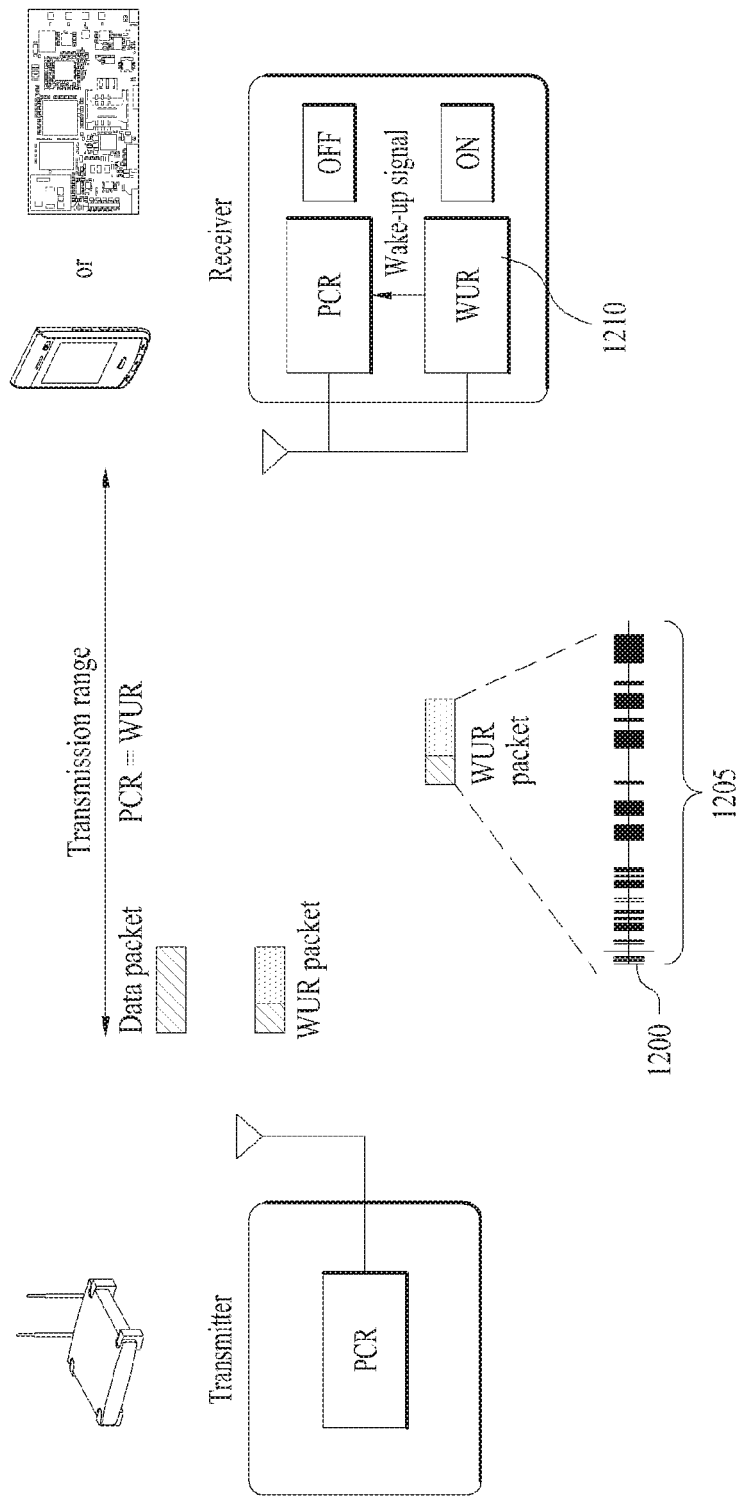
FIG. 12 is an explanatory diagram of operation of a WUR receiver.

FIG. 12 is an explanatory diagram of design and operation of a WUR packet.

Referring to FIG. 12, the WUR packet may include a PCR part 1200 and a WUR part 1205.

The PCR part 1200 is used for coexistence with a legacy WLAN system and the PCR part may be referred to as a WLAN preamble. To protect the WUR packet from other PCR STAs, at least one of an L-STF, an L-LTF, or an L-SIG of a legacy WLAN may be included in the PCR part 1200. Therefore, a third party legacy STA may be aware, through the PCR part 1200 of the WUR packet, that the WUR packet is not intended therefor and a medium of a PCR has been occupied by another STA. However, the WURx does not decode the PCR part of the WUR packet. This is because the WURx supporting narrowband and OOK demodulation does not support reception of a PCR signal.

At least a portion of the WUR part 1205 may be modulated using OOK. For example, the WUR part may include at least one of a WUR preamble, a MAC header (e.g., a receiver address, etc.), a frame body, or a Frame Check Sequence (FCS). OOK modulation may be performed by correcting an OFDM transmitter.

A WURx 1210 may consume very low power less than 100 μW as described above and may be implemented by a small, simple OOK demodulator.

Thus, since the WUR packet needs to be designed to be compatible with the WLAN system, the WUR packet may include a preamble (e.g., an OFDM scheme) of a legacy WLAN and a new Low-Power (LP)-WUR signal waveform (e.g., an OOK scheme).

Figure 13:
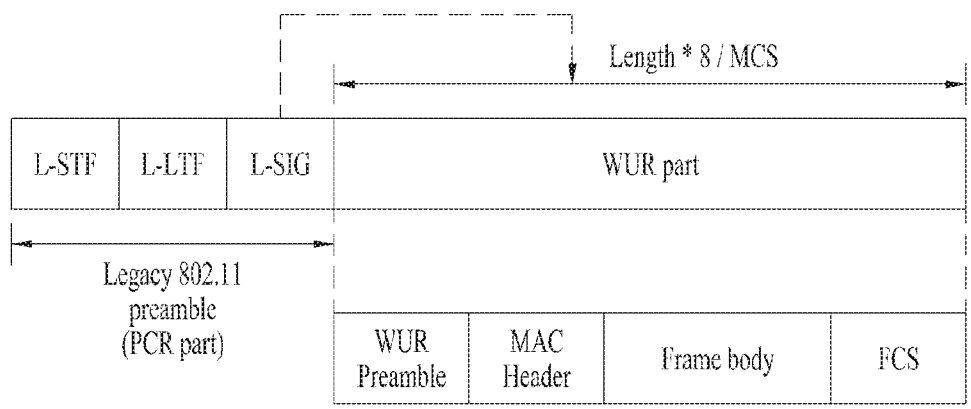
FIG. 13 illustrates an example of a WUR packet.

FIG. 13 illustrates an example of a WUR packet. The WUR packet of FIG. 13 includes a PCR part (e.g., a legacy WLAN preamble) for coexistence with a legacy STA.

Referring to FIG. 13, the legacy WLAN preamble may include an L-STF, an L-LTF, and an L-SIG. A WLAN STA (e.g., a third party) may detect the beginning of the WUR packet through the L-STF. The WLAN STA (e.g., the third party) may detect the end of the WUR packet through the L-SIG. For example, the L-SIG field may indicate the length of a (e.g., OOK-modulated) payload of the WUR packet.

A WUR part may include at least one of a WUR preamble, a MAC header, a frame body, or an FCS. The WUR preamble may include, for example, a PN sequence. The MAC header may include a receiver address. The frame body may include other information necessary for wake-up. The FCS may include a Cyclic Redundancy Check (CRC).

Figure 14:
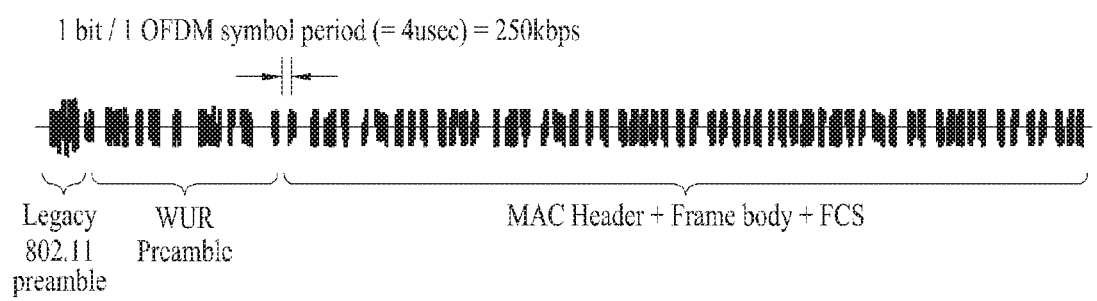
FIG. 14 illustrates the waveform of a WUR packet.

FIG. 14 illustrates the waveform of the WUR packet of FIG. 13. Referring to FIG. 14, in an OOK-modulated WUR part, one bit per OFDM symbol period (e.g., 4 μsec) may be transmitted. Therefore, a data rate of the WUR part may be 250 kbps.

Figure 15:
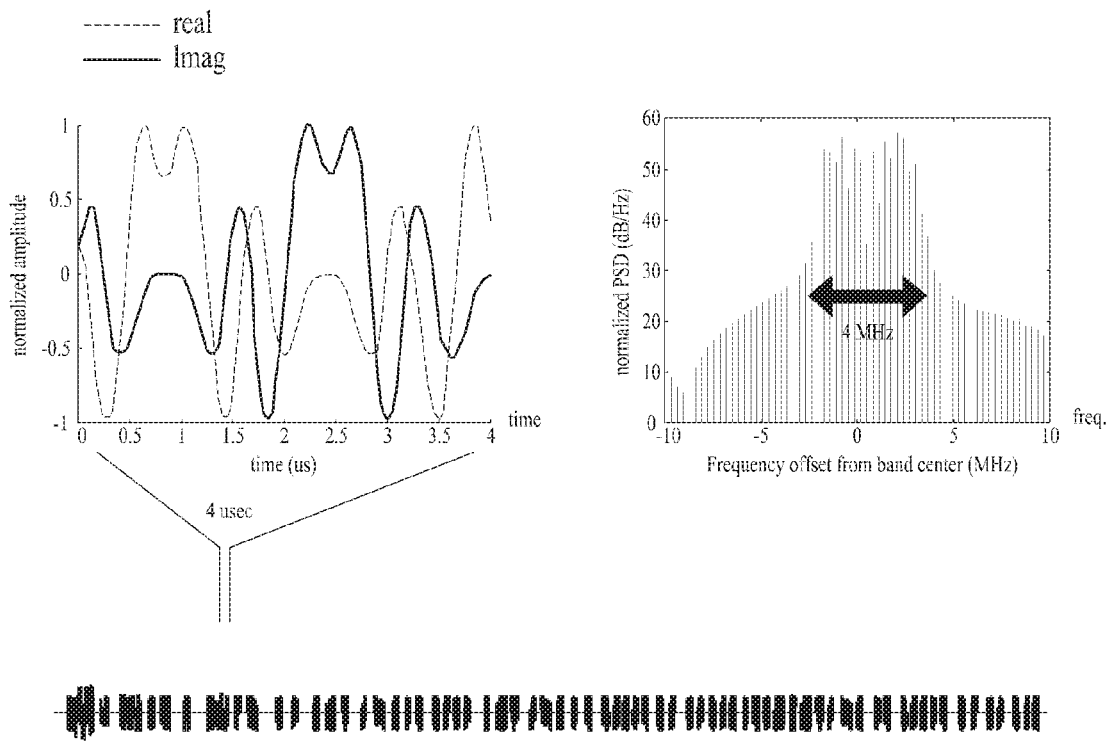
FIG. 15 is an explanatory diagram of a WUR packet generated using an OFDM transmitter of a WLAN.

FIG. 15 is an explanatory diagram of a WUR packet generated using an OFDM transmitter of a WLAN. In the WLAN, a Phase Shift Keying (PSK)-OFDM transmission scheme is used. If the WUR packet is generated by adding a separate OOK modulator for OOK modulation, implementation cost of a transmitter may increase. Therefore, a method of generating the OOK-modulated WUR packet by reusing an OFDM transmitter is considered.

According to an OOK modulation scheme, a bit value of 1 is modulated to a symbol having power of a threshold value or more (i.e., on) and a bit value of 0 is modulated to a symbol having power lower than the threshold value (i.e., off). Obviously, the bit value of 1 may be defined as power 'off'.

Thus, in the OOK modulation scheme, the bit value of 1/0 is indicated through power-on/off at a corresponding symbol position. The above-described simple OOK modulation/demodulation scheme is advantageous in that power consumed to detect/demodulate a signal of a receiver and cost for receiver implementation may be reduced. OOK modulation for turning a signal of/off may be performed by reusing a legacy OFDM transmitter.

The left graph of FIG. 15 illustrates a real part and an imaginary part of a normalized amplitude during one symbol period (e.g., 4 μsec) for an OOK-modulated bit value 1 by reusing an OFDM transmitter of a legacy WLAN. Since an OOK-modulated result for a bit value 0 corresponds to power-off, this is not illustrated.

The right graph of FIG. 15 illustrates normalized Power Spectral Density (PSD) for an OOK-modulated bit value 1 on the frequency domain by reusing the OFDM transmitter of the legacy WLAN. For example, a center 4 MHz may be used for WUR in a corresponding band. In FIG. 15, although WUR operates in a bandwidth of 4 MHz, this is for convenience of description and frequency bandwidths of other sizes may be used. In this case, it is desirable that WUR operate in a narrower bandwidth than an operating bandwidth of a PCR (e.g., the legacy WLAN) in order to reduce power.

In FIG. 15, it is assumed that a subcarrier width (e.g., subcarrier spacing) is 312.5 kHz and an OOK pulse bandwidth corresponds to 13 subcarriers. The 13 subcarriers correspond to about 4 MHz (i.e., 4.06 MHz=13*312.5 kHz) as described above.

In the legacy OFDM transmitter, an input sequence of Inverse Fast Fourier Transform (IFFT) is defined as s={13 subcarrier tone sequence} and IFFT for the sequence s is performed as $X_t$=IFFT(s) and then a Cyclic Prefix (CP) of a length of 0.8 μsec is added, thereby generating a symbol period of about 4 μs.

The WUR packet may also be referred to as a WUR signal, a WUR frame, or a WUR PPDU. The WUR packet may be a packet for broadcast/multicast (e.g., a WUR beacon) or a packet for unicast (e.g., a packet for ending and then waking up a WUR mode of a specific WUR STA).

Figure 16:
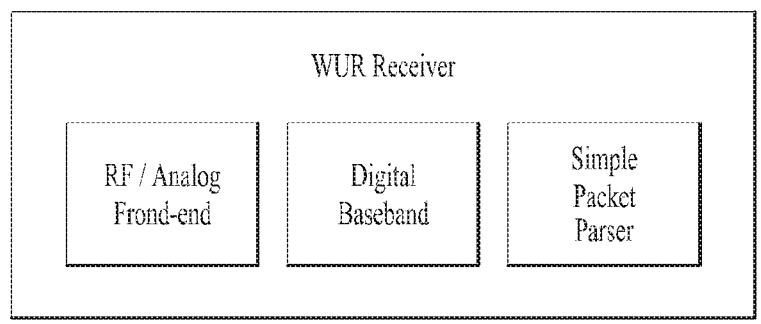
FIG. 16 illustrates the structure of a WUR receiver.

FIG. 16 illustrates the structure of a WURx. Referring to FIG. 16, the WURx may include an RF/analog front-end, a digital baseband processor, and a simple packet parser. FIG. 16 illustrates an exemplary structure of the WURx and the WURx of the present invention is not limited to the configuration of FIG. 16.

Hereinbelow, a WLAN STA having the WURx is simply referred to as a WUR STA. The WUR STA may be simply referred to as an STA.

WUR PPDU

As described above, an STA may operate in a WUR mode and turn off a PCR in order to reduce power consumption of the STA. If data to be transmitted by an AP to the WUR STA is received, the AP may transmit a WUR packet to the STA to wake the STA and transmit data through the PCR.

Since the WUR packet is encoded using OOK and then is transmitted, the WUR packet has a relatively low transmission rate. Therefore, relatively much time is consumed even for transmission of a small WUR packet. In a dense WLAN environment, if the AP transmits the WUR packet to each STA in one-to-one correspondence, this causes waste of resources and increase in contention so that a network may become inefficient. Accordingly, the WUR packet needs to be efficiently designed by reflecting the above considerations.

A payload of the WUP packet may include a preamble and content.

Figure 17:
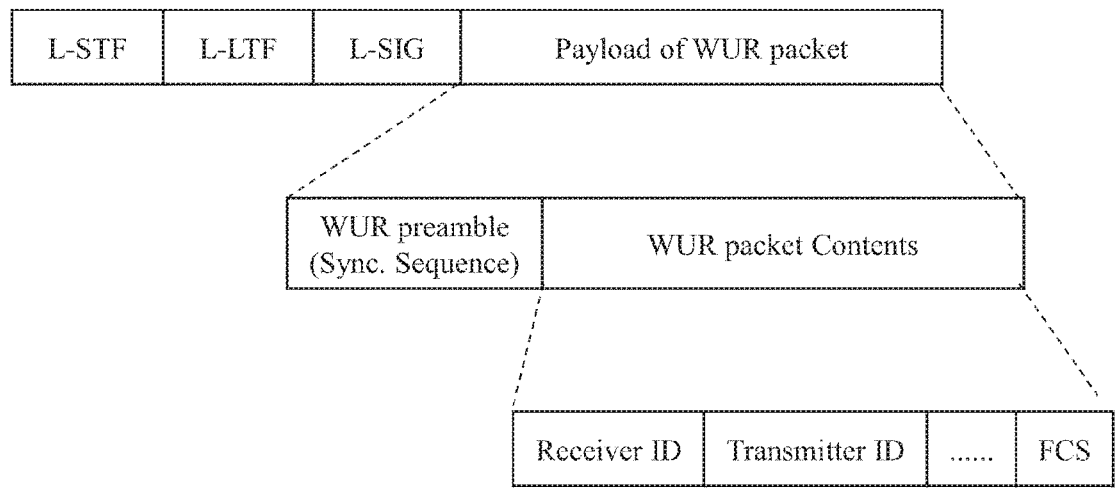
FIG. 17 illustrates an exemplary WUT packet according to the present invention.

FIG. 17 illustrates an exemplary WUT packet according to the present invention. Referring to FIG. 17, WUP content may include information about a receiver ID and/or a transmitter ID.

Figure 18:
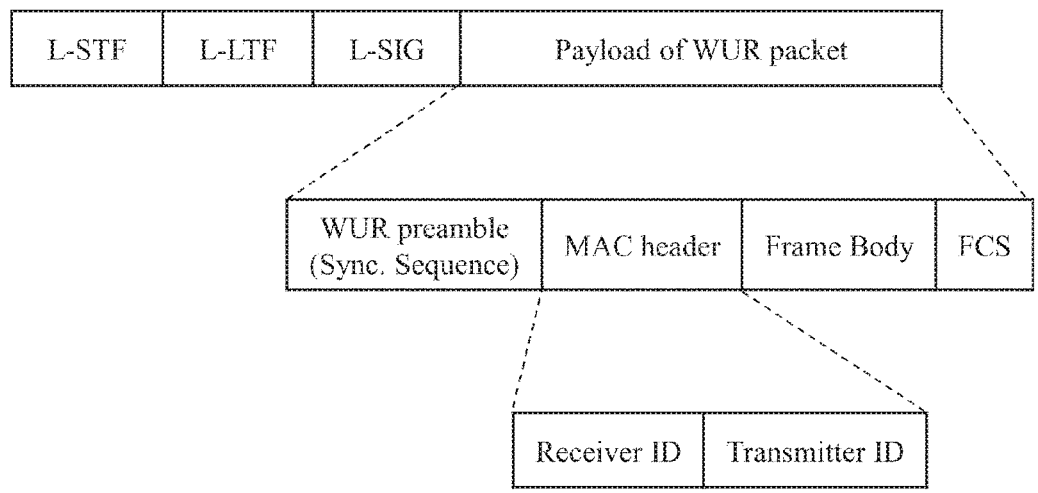
FIG. 18 illustrates another exemplary WUT packet according to the present invention.

FIG. 18 illustrates another exemplary WUT packet according to the present invention. Referring to FIG. 18, WUP content may include at least one of a MAC header, a frame body, or an FCS. The header of the WUP packet may include at least one of a receiver ID or a transmitter ID according to a frame type of the WUP packet.

In embodiments which will be described below, the WUR packet of FIG. 17 or FIG. 18 may be used. However, for description, the embodiments will be described under the assumption that the WUR packet of FIG. 18 having the structure of the MAC header is used.

The receiver ID may be an AID or a MAC address but the present invention is not limited thereto. If a WUR transmitter (e.g., an AP) allocates an ID dedicated to a WUR mode (e.g., a WUR ID) to an STA, the WUR ID may be used as the receiver ID. In the below-described embodiments, it is assumed that the AID is used as the receiver ID for convenience of description. However, the present invention is not limited thereto and other values (e.g., the WUR ID) may be used as the receiver ID.

The transmitter ID may be, for example, a BSS color, a BSSID, a transmitter MAC address, or a newly defined WUR transmitter ID. If the transmitter ID is directly/indirectly indicated through another part of the WUR packet (e.g., the transmitter ID is included in a WUR preamble), the transmitter ID may be omitted from the WUR MAC header. For convenience, a description will be given hereinbelow under the assumption that the BSS color is used as the transmitter ID.

For example, when the AID is received as the receiver ID, the AID may be as follows.

AID=0 may indicate a broadcast ID. If the AP transmits the WUR packet in which the AID is set to 0, all WUR STAs associated with the AP may receive the WUR packet and may wake up.

The AID may be set to AID=Group ID. In this case, STAs belonging to a corresponding group may receive the WUR packet and may be awakened. A WUR STA may receive a group ID allocated thereto from the AP before entering a WUR mode.

The AID may be set to AID=Individual AID. In this case, only a specific STA indicated through the individual AID may receive the WUR packet and may wake up.

For example, a TIM may be transmitted through the WUR packet. For example, when the receiver ID (e.g., AID) has a specific value (e.g., a broadcast ID, group ID, or special ID value), the TIM may be included in the WUP content. Alternatively, the TIM may be included in the receiver ID.

In the above examples, the transmitter ID may be omitted. For example, if the transmitter ID (e.g., BSS color) is transmitted in the WUR preamble, the transmitter ID may be omitted from the WUP content (e.g., MAC header).

If a multicast ID value (e.g., a group ID) or a broadcast ID value, instead of an ID of an individual STA (e.g., an individual AID), is transmitted at a bit position corresponding to the receiver ID, this may be interpreted as omission of the receiver ID. For instance, this may be interpreted as omission of a field corresponding to the ID of the individual STA from the WUR packet and transmission of a special value for multicast/broadcast.

Figure 19:
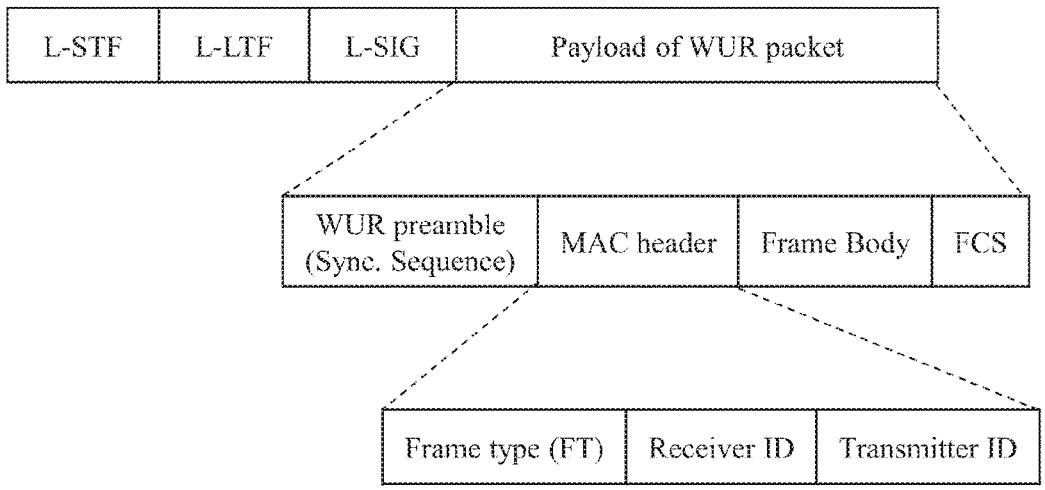
FIG. 19 illustrates a WUR packet according to another embodiment of the present invention.

FIG. 19 illustrates a WUR packet according to an embodiment of the present invention.

According to an example of the present invention, WUP content may have various frame formats. Therefore, a type of the WUR packet (i.e., a WUR frame type) may be indicated within the WUR packet. For example, frame type (FT) information may be included at a start point of the WUP content. Specifically, a MAC header may be located at the start point of the WUP content. The MAC header may include a frame control field. The frame control field may include a frame type subfield.

The name of frame type has been assigned for convenience of description and the present invention is not limited to such a name. For example, the term frame type may be defined/used as other names (e.g., a packet type, a frame control type, a content type, a receiver address type, etc.).

Figure 20:
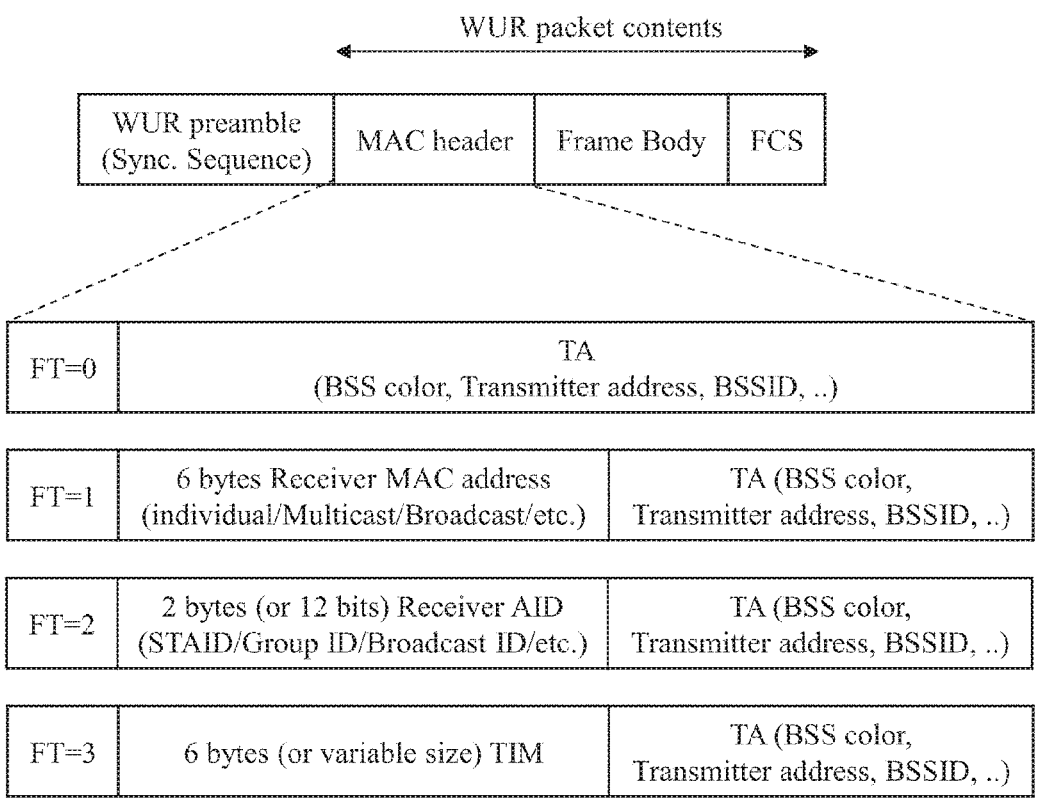
FIG. 20 illustrates various formats of a WUR packet according to an embodiment of the present invention.

FIG. 20 illustrates various formats of a WUR packet according to an embodiment of the present invention.

Referring to FIG. 20, the WUR packet may include different information according to frame type.

Frame Type=0 indicates that the size of a receiver ID is 0 (i.e., the receiver ID is not included). This may implicitly represent that the WUR packet is a broadcast WUR packet. For example, Frame Type=0 may indicate that all WUR STAs belonging to a corresponding WUR AP should receive the WUR packet.

Frame Type=1 may indicate that the size of the receiver ID is the size of a MAC address (6 bytes). For example, if Frame Type=1, then a broadcast address, a multicast address, or an individual address of a size of 6 bytes may be configured in the receiver ID.

Frame Type=2 may indicate that the size of the receiver ID is the size of an AID (e.g., 12 bits or 2 bytes). For example, when Frame Type=2, the AID may be included as the receiver ID and the AID may be a broadcast AID (e.g., 0), a group/multicast AID, or an individual AID. The broadcast AID of 0 is one example and, according to another example, the broadcast AID may be a partial BSSID of a corresponding AP or a value in which all bits are set to 1.

Frame Type=3 may indicate TIM-based wake-up. When Frame Type=3, TIM information may be transmitted at a receiver address/ID part or instead of the receiver address/ID. A TIM may indicate which WUR STAs should be awakened. A WUR STA may determine whether to wake up based on the TIM information included in the WUR packet.

If the receiver address/ID is included in the WUR packet and it is determined that only one of the receiver ID and the receiver address is used, then only one of FT=1 and FT=2 may be used. For example, if the AID is used as the receiver ID, Frame Type=1 indicating the size of the MAC address may not be used and only Frame Type=2 may be used.

Figure 21:
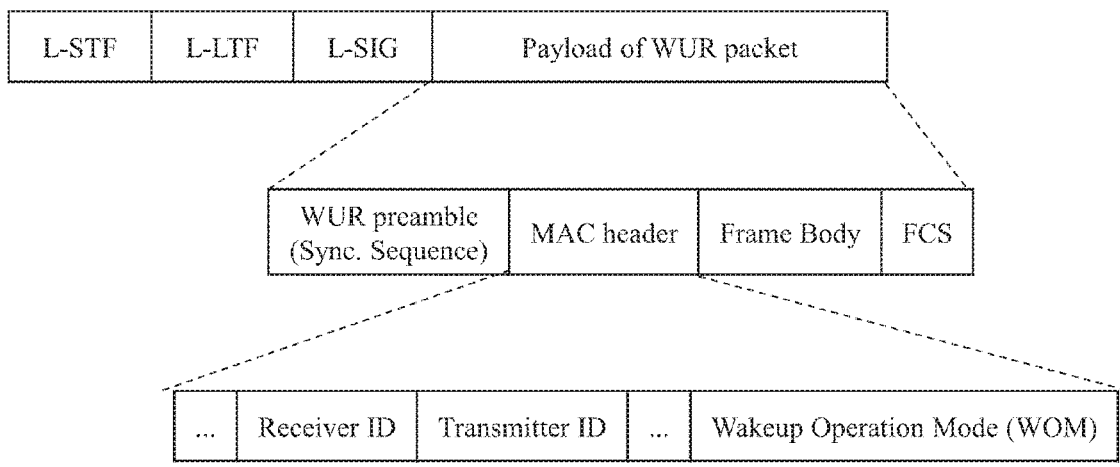
FIG. 21 illustrates a WUR packet according to another embodiment of the present invention.

FIG. 21 illustrates a WUR packet according to an embodiment of the present invention.

Referring to FIG. 21, the WUR packet may include information as to how WUR STAs that have received the WUR packet should perform a wake-up operation (hereinafter, Wake-up Operation Mode (WOM) information)). Although the WOM information may be included in a MAC header of the WUR packet as illustrated in FIG. 21, the WOM information may be included in a frame body as another example.

WOM=0: No wake-up (a PCR is not turned on). After receiving the WUR packet, an STA does not turn on the PCR. That is, the STA does not perform a wake-up operation. For example, if an AP desires to update only system information through the WUR packet or transmits the WUR packet for simple keep-alive check, the WOM may be set to 00 (no wake-up). However, the STA ends reception of the WUR packet even though the STA does not wake up.

WOM=1: Transmission of a wake-up ACK signal/frame (e.g., PS-Poll) after wake-up. After the STA receives the WUR packet, the STA turns on the PCR (i.e., performs a wake-up operation), and then demands transmission of the wake-up ACK signal/frame (e.g., PS-Poll). When the AP wakes up STAs to transmit unicast data, the WOM is set to 01 (PS-Poll transmission after wake-up). The WOM is set to 1 when the receiver ID is configured as an individual ID or a group ID or when the AP wakes up a portion of STAs using a TIM.

WOM=2: Frame reception standby after wake-up. After receiving the WUR packet, the STA turns on the PCR (i.e., performs a wake-up operation) and waits for a PCR frame to be received. For example, if the AP desires to transmit the WUR packet to STAs and transmit broadcast/multicast data through the PCR, the AP may set the WOM of the WUR packet to 2. Alternatively, if the AP desires to transmit a trigger frame for group polling of the PCR such as a UL MU, the AP may set the WOM of the WUR packet to 2. In addition, when the AP desires to perform group polling, the AP may set the WOM of the WUR packet to 2 (i.e., binary 10) even upon transmitting a unicast WUR packet through the individual ID/address.

As another example, the WOM information may be defined as one bit. In this case, the 1-bit WOM information may indicate whether a WUR STA should wake up after receiving the WUR packet.

WOM=0 (no wake-up indication): WOM=0 may indicate that the WUR STA should continuously maintain a WUR mode without waking up after receiving the WUR packet.

WOM=1 (wake-up indication): WOM=1 may indicate that the WUR STA should wake up after receiving the WUR packet. Therefore, the WUR STA performs a wake-up procedure after receiving the WUR packet.

The WOM information may be used in all formats such as a WUR packet format structure in which WUR content is started with a frame type as well as a WUR packet format structure in which the WUR content is started with a receiver address/ID.

The WOM information is not always an explicit additional indicator. As an example, the WOM information may be included in the frame type. For example, the WOM information may be implicitly indicated through frame type information. The frame type implicitly indicating the WOM information may be defined, for example, as follows.

Frame Type=0 may indicate a broadcast WUR packet in which the receiver ID is not included and indicate a wake-up request. For example, Frame Type=0 may indicate that all WUR STAs belonging to STAs (e.g., AP) indicated by the transmitter ID included in the WUR packet should wake up upon receiving the WUR packet. In this case, the WUR STA may not transmit a wake-up ACK signal/frame (e.g., PS-Poll) to the AR after waking up. As an example, when the AP transmits broadcast data/frame (e.g., a beacon, a TIM, etc.) such as DTIM traffic, the frame type may be set to 0.

Frame Type=1 may indicate a broadcast WUR packet in which the receiver ID is not included and indicate no wake-up. For example, Frame Type=1 may indicate that the WUR STA should receive only the WUR packet and should not perform wake-up. When the AP desires to transmit system information through, for example, the WUR packet or transmits the WUR packet for keep-alive check, the AP may set the frame type to 1. Upon receiving the WUR packet with Frame Type=1, the WUR STA may not turn on the PCR and may continue to maintain an off state. When the AP transmits the system information through the WUR packet, the WUR STA may update the system information based on information included in a corresponding frame (e.g., operating channel information, time alignment information, etc.). If the WUR packet is transmitted for keep-alive check, additional information (e.g., system information) may not be included in the WUR packet.

Frame Type=2 may indicate a WUR packet in which the receiver ID is included and the size of the receiver ID is the size of the AID (e.g., 2 bytes or 12 bits) and indicate that STAs should perform a wake-up procedure after receiving the WUR packet. After waking up, the STAs may transmit a wake-up ACK signal/frame (e.g., PS-Poll). As an example, the AID may be configured as an individual AID but may also be configured as a broadcast ID or a multicast/group ID.

Frame Type=3 may indicate a WUR packet in which the receiver ID is included in the WUR packet and the size of the receiver ID is the size of the AID (e.g., 2 bytes or 12 bits) and indicate that the STAs should perform the wake-up procedure after receiving the WUR packet. However, as opposed to Frame Type=2, the STAs in Frame Type=3 may not transmit the wake-up ACK signal/frame (e.g., PS-Poll) after waking up and may wait for a PCR frame to be received from the AP. As an example, the AID may be configured as the multicast/group AID but may also be configured as the broadcast ID or the individual AID.

Frame Type=4 may indicate a WUR packet in which the receiver ID is included and the size of the receiver ID is the size of the MAC address (e.g., 6 bytes) and indicate that the STAs should perform the wake-up procedure after receiving the WUR packet. After waking up, the STAs may transmit the wake-up ACK signal/frame (e.g., PS-Poll). For example, the MAC address may be configured as the individual MAC address but may also be configured as one of the broadcast/multicast/group MAC addresses.

Frame Type=5 may indicate a WUR packet in which the receiver ID is included and the size of the receiver ID is the size of the MAC address (e.g., 6 bytes) and indicate that the STAs should perform the wake-up procedure after receiving the WUR packet. However, as opposed to Frame Type=4, the STAs in Frame Type=6 may wait for the PCR frame to be received from the AP without transmitting the wake-up ACK signal/frame (e.g., PS-Poll) after waking up. For example, the MAC address may be configured as the multicast/group MAC address but may also be configured as the individual MAC address or the broadcast MAC address.

Frame Type=6 may indicate TIM-based wake-up. If Frame Type=6 is configured, the WUR STA may perform TIM-based wake-up and TIM information may be included in a receiver address/ID part of the WUR packet or instead of the receiver address/ID. The TIM includes information as to which WUR STAs should wake up. Therefore, the WUR STA determines whether to wake up based on the TIM information.

The above-described frame types are exemplary and the scope of the present invention is not limited thereto and other frame types may be further added thereto or only a portion of the above frame types may be used. For example, if only one of the MAC address and the AID is used as the receiver address/ID as described above, only one set of Frame Type=2 and 3 and Frame Type=4 and 5 may be used.

As another example, when the frame type indicates a wake-up frame (e.g., a WUR frame requesting that the PCR be turned on) and the address field of the MAC header is configured as the individual WUR ID, the WUR frame may be a unicast wake-up frame. Upon receiving the WUR frame (i.e., unicast wake-up frame), the STA turns on the PCR (e.g., WLAN) and then transmits an ACK/response signal for the WUR frame to the AP through the PCR. However, although the frame type indicates the wake-up frame, if the address field of the MAC header is not configured as the individual WUR ID, the STA that has received the wake-up frame turns on the PCR and does not transmit the ACK/response signal for the WUR frame to the AP.

Alternatively, the frame type may not be separately defined and the WOM/frame type may be directly/indirectly indicated through other fields of the WUR packet. As an example, WOM information may be included in the receiver ID in a WUR packet format in which the receiver ID is located at the foremost part in the WUR content. As a more specific example, the WOM information indicated according to the value of the receiver ID may be defined as follows.

The receiver ID may be configured as Receiver ID=Individual AID that indicates wake-up of a WUR STA corresponding to an individual AID. After waking up, the WUR STA may attempt to transmit a wake-up ACK signal (e.g., PS-Poll).

The receiver ID may be configured as Receiver ID=Broadcast AID that indicates that all WUR STAs should wake up. For example, the broadcast AID may be set to 0 but the present invention is not limited thereto. As another example, the broadcast AID may be all 1s, a partial BSSID, or partial BSSID+x (where x is an integer greater than 0). After waking up, the WUR STAs may wait for a PCR frame to be received without attempting to transmit the wake-up ACK signal (e.g., PS-Poll, QoS null, or a wake-up notification frame).

The receiver ID may be configured as Receiver ID=Special AID 1. Special AID 1 may correspond to the case in which all bits are set to 1, 2017, 2016, or the like but the present invention is not limited thereto. As another example, Special AID 1 may be all 1s, a partial BSSID, or partial BSSID+x (where x is an integer greater than 0). Special AID 1 may indicate that all WUR STAs receive the WUR packet but should not wake up. For example, even when the WUR STA receives the WUR packet, the WUR STA may not turn on the PCR and may maintain a WUR mode. For example, when the WUR packet includes system information (e.g., channel switch information, time alignment information, etc.), the WUR STA may update system information stored in the WUR STA based on the information included in the WUR packet. As another example, the WUR packet may correspond to a WUR beacon or a vendor specific frame.

The receiver ID may be configured as Receiver ID=Group AID that indicates WUR STAs belonging to a corresponding group should wake up. After waking up, the WUR STAs may wait for the PCR frame to be received without attempting to transmit the wake-up ACK signal (e.g., PS-Poll). The PCR frame may be, for example, a multicast/groupcast frame, a trigger frame, or a group polling frame, but the present invention is not limited thereto.

The receiver ID may be configured as Receiver ID=Special AID 2. Special AID 2 may indicate that a TIM is included in the WUR packet content. For example, Special AID 2 may be 2047 or 2046 but the present invention is not limited thereto. The WUR STA may determine whether to wake up based on TIM information included in the WUR packet. For example, if the TIM indicates information about a corresponding STA, the STA may perform a wake-up procedure.

Indication of the WOM through the receiver ID described above is also exemplary and the scope of the present invention is not limited thereto. For example, all of the above-mentioned receiver ID values are not always used and only a portion of the above receiver ID values may be used or other receiver ID values may be further added.

WUR PPDU Broadcast/Multicast

Next, more detailed examples of a wake-up method for transmitting PCR broadcast data to STAs which are in a WUR mode will now be described.

In a legacy WLAN (e.g., PCR) system, when group addressed frames (e.g., buffered non-GCR (groupcast with retries) group addressed Bufferable Units (BUs)) such as broadcast/multicast data are transmitted, a broadcast/multicast address is configured in an RA field. A BU may be a MAC Service Data Unit (MSDU), an Aggregated-MSDU (A-MSDU), or a bufferable MAC Management Protocol Data Unit (MMPDU).

In a WLAN system supporting WUR, when an AP desires to transmit PCR broadcast data, the AP may wake STAs and transmit the broadcast data using a broadcast address among group addresses.

Since the PCR broadcast data may be data that should be transmitted to STAs of a normal state (e.g., a PCR mode) as well as a WUR STA, the PCR broadcast data needs to be transmitted in consideration of all STAs. In a legacy WLAN system, the AP transmits a DTIM and then transmits a group addressed frame or BUs (e.g., broadcast traffic) before transmitting individual addressed BUs, in consideration of STAs operating in a Power Saving (PS) mode. Hereinafter, a description will be given using the name of the group addressed BU(s).

A method of transmitting the group addressed BUs in consideration of a WUR STA will now be described.

To transmit the group addressed BU, an AP (e.g., a WUR transmitter) may transmit a WUR packet in a broadcast scheme to wake all STAs of a WUR mode that are connected to the AP.

Figure 22:
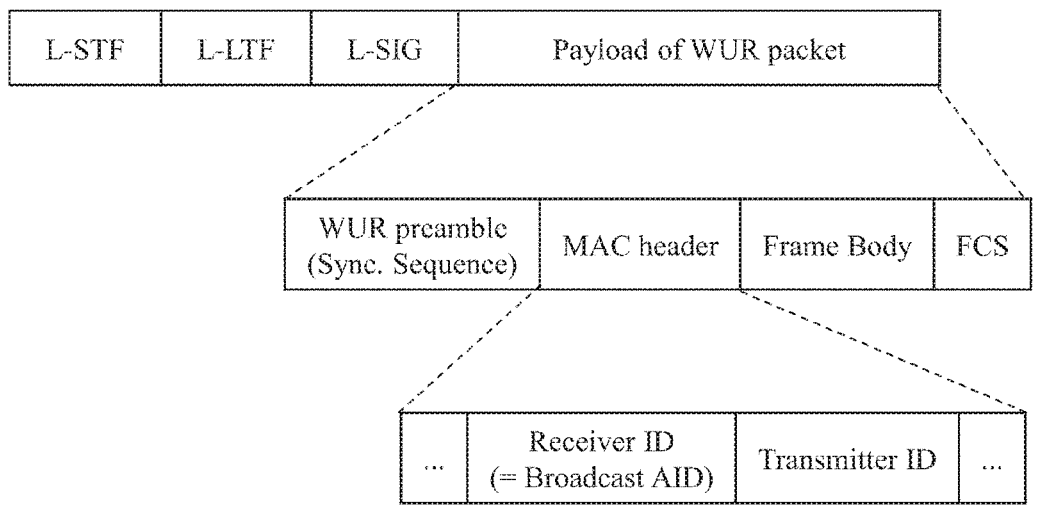
FIG. 22 illustrates a WUR packet transmitted in a broadcast scheme according to an embodiment of the present invention.

FIG. 22 illustrates a WUR packet transmitted in a broadcast scheme according to an embodiment of the present invention.

Referring to FIG. 22, a broadcast address or a broadcast AID may be configured in a receiver ID of the WUR packet. If a broadcast ID is configured as a transmitter ID such as a partial BSSID, the WUR packet in which the transmitter ID is omitted may be transmitted. Alternatively, if the transmitter ID is transmitted in another part such as an FCS, the receiver ID may indicate the broadcast ID and the WUR packet in which the transmitter ID is omitted may be transmitted.

Upon receiving a broadcast WUR packet, a WUR STA turns on a PCR to receive a group addressed BU (e.g., broadcast data) and waits for the broadcast data to be received.

Figure 23:
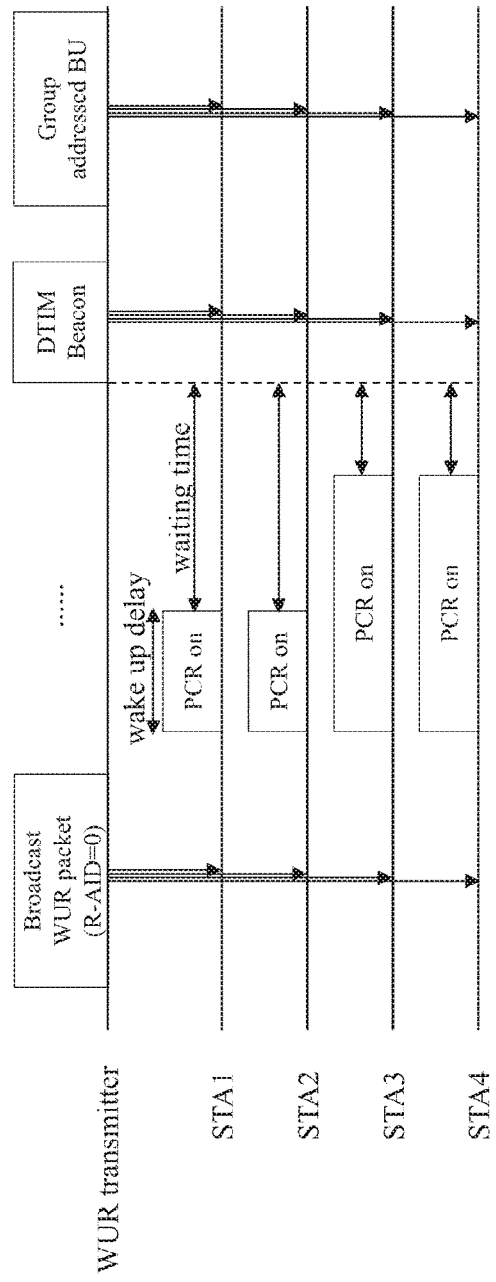
FIG. 23 illustrates an exemplary operation of a WUR STA receiving broadcast data after turning on a PCR

FIG. 23 illustrates an exemplary operation of a WUR STA receiving broadcast data after turning on a PCR.

Wake-up delay consumed from a WUR mode to PCR-on may differ according to capabilities of a WUR STA. Referring to FIG. 23, WUR STAs 1 and 2 end wake-up earlier than STAs 3 and 4 and wait for a group addressed BU to be received. In this case, STAs 1 and 2 may consume unnecessary power because a wait time from PCR-on to reception of the group addressed BU increases.

A WUR transmitter previously transmits a broadcast WUR packet with a sufficient time before transmitting a DTIM so that all WUR STAs may receive, without loss, a DTIM and/or a group addressed BU transmitted after the DTIM after waking up. Particularly, in a channel congestion or dense situation, a time interval from transmission of a broadcast WUR packet to transmission of the DTIM/group addressed BU by the WUR transmitter is set to be relatively long and, then, power consumption of the WUR STAs may increase.

Methods for solving such issues are proposed according to an embodiment of the present invention.

Figure 24:
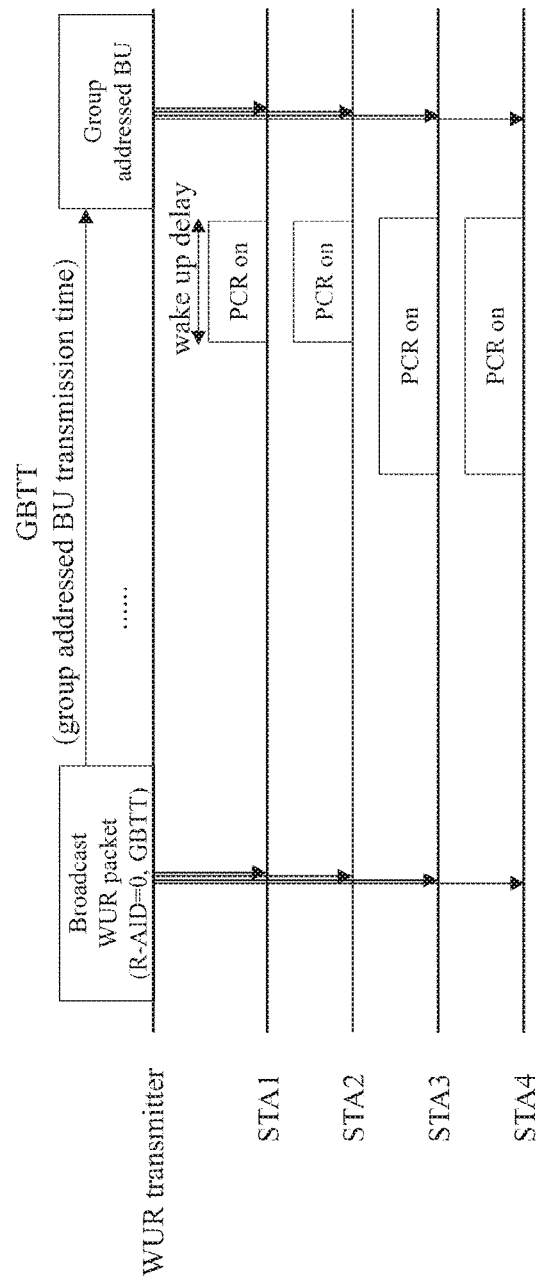
FIG. 24 illustrates transmission of a broadcast WUR packet and a group addressed BU according to an embodiment of the present invention.

FIG. 24 illustrates transmission of a broadcast WUR packet and a group addressed BU according to an embodiment of the present invention.

As an example, a Group addressed BU Transmission Time (GBTT) may be newly defined. The GBTT may be information about a time at which an AP is to transmit a group addressed BU.

Referring to FIG. 24, upon transmitting the broadcast WUR packet, a WUR transmitter (e.g., AP) may include the GBTT in the WUR packet. STAs may determine a timing at which a PCR-on procedure is to be started based on the GBTT included in the WUR packet and wake-up delay thereof. The STAs start the PCR-on procedure at the determined timing and wait for a group address BU to be received. For example, STAs 3 and 4 start the PCR-on procedure earlier than STAs 1 and 2.

The AP may transmit the group addressed BU at a timing indicated by the GBTT or after the timing indicated by the GBTT.

Figure 25:
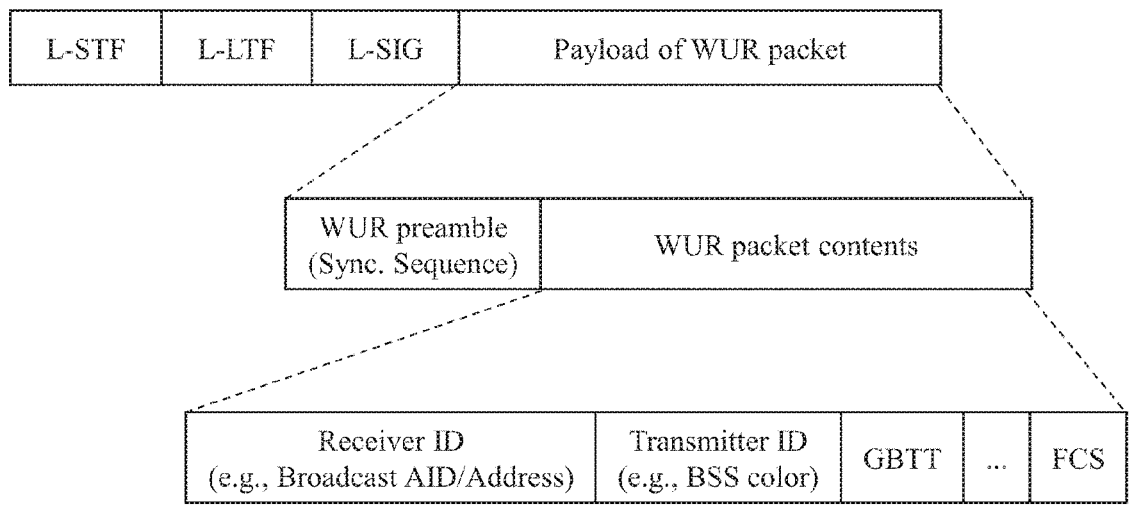
FIG. 25 illustrates a WUR packet including a GBTT according to an embodiment of the present invention.

FIG. 25 illustrates a WUR packet including a GBTT according to an embodiment of the present invention. For example, when a receiver ID is set to a broadcast ID (e.g., AID=0), the WUR packet may include the GBTT.

Figure 26:
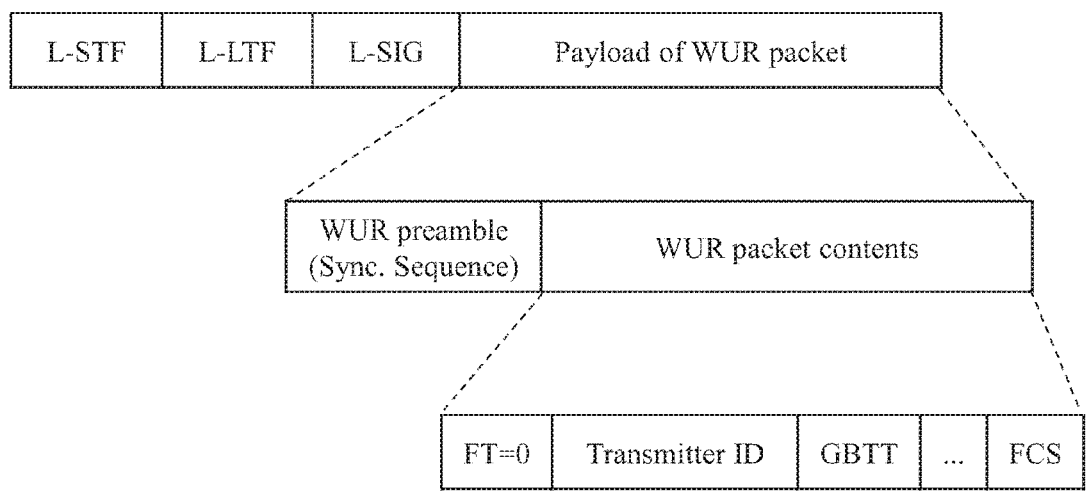
FIG. 26 illustrates a WUR packet including a GBTT according to another embodiment of the present invention.

FIG. 26 illustrates a WUR packet including a GBTT according to another embodiment of the present invention. In FIG. 26, if a Frame Type (FT) of the WUR packet indicates broadcast wake-up (e.g., 0), the GBTT is included in the WUR packet.

Figure 27:
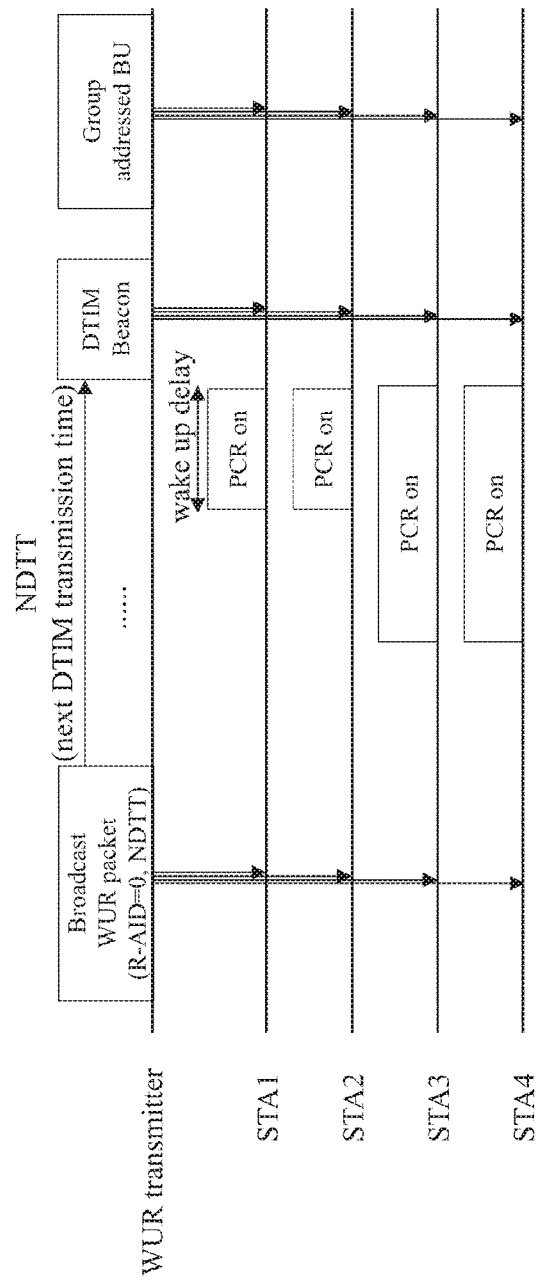
FIG. 27 illustrates transmission of a broadcast WUR packet and a group addressed BU according to another embodiment of the present invention.

FIG. 27 illustrates transmission of a broadcast WUR packet and a group addressed BU according to another embodiment of the present invention.

As an example, the above-described GBTT may be replaced with a Next DTIM Transmission Time (NDTT) or a next Target Beacon Transmission Time (TBTT) or may indicate the NDTT or the TBTT.

Referring to FIG. 27, a WUR transmitter (e.g., AP) may transmit the NDTT or TBTT in the broadcast WUR packet. STAs which are in a WUR mode end wake-up (e.g., PCR-on) prior to the beginning of a DTIM based on the NDTT or the TBTT included in the broadcast WUR packet. STAs receive the DTIM and the group addressed BU through the PCR.

Figure 28:
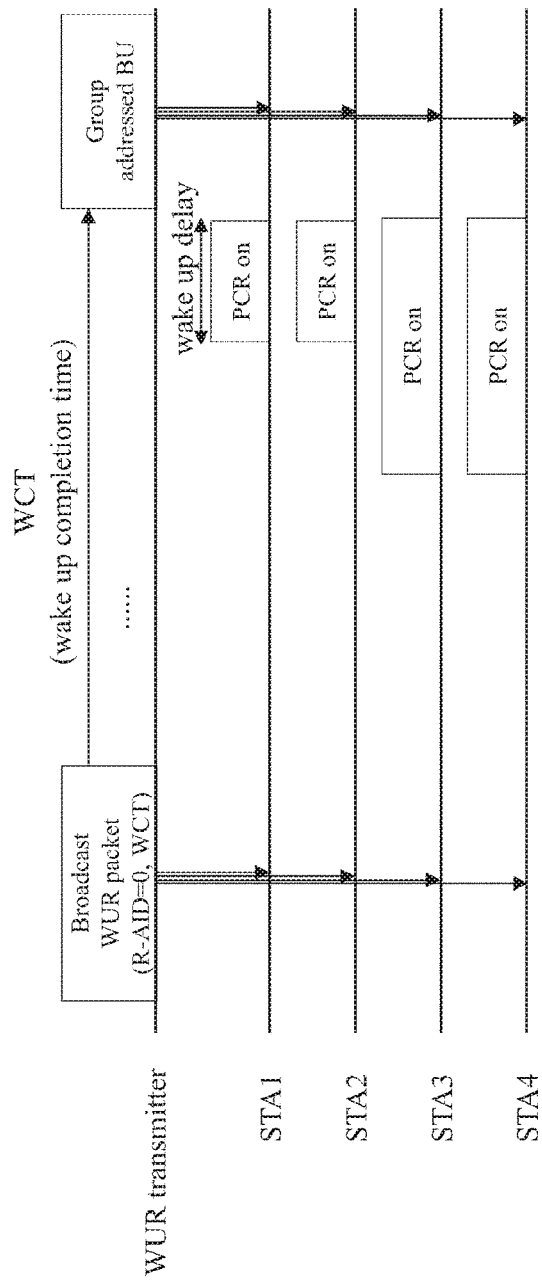
FIG. 28 illustrates transmission of a broadcast WUR packet and a group addressed BU according to another embodiment of the present invention.

FIG. 28 illustrates transmission of a broadcast WUR packet and a group addressed BU according to another embodiment of the present invention.

The afore-mentioned GBTT, NDTT, and/or TBTT may be generalized as a Wake-up Completion Time (WCT). For example, the WCT may indicate a time at which STAs receive a WUR packet and should end a wake-up procedure (e.g., PCR-on). The WCT may be represented as an absolute time or a relative time (e.g., a duration from an end of the WUR packet).

Referring to FIG. 28, a WUR transmitter (e.g., AP) transmits a broadcast WUR packet including the WCT. Upon receiving information about the WCT, STAs which are in a WUR mode end the wake-up procedure until a time indicated by the WCT and receive data (e.g. group addressed BU) transmitted by the AP through a PCR.

In the example of FIG. 28, it is assumed that the WCT indicates a transmission start time of the group addressed BU but the present invention is not limited thereto. As another example, the WCT may indicate an NDTT/TBTT. The present invention is not limited to the name of WCT and the name of a time information field indicating the above-mentioned frame transmission time may be referred to by other names such as a scheduling time.

Such time information (e.g., GBTT, NDTT, TBTT, and WCT) may be transmitted in a normal WUR packet such as a unicast (individual)/multicast packet as well as a broadcast WUR packet. For example, if the WCT is included in the normal WUR packet, the AP may configure the WCT in consideration of wake-up delay of a corresponding STA. The STA may determine a start time of a PCR-on procedure based on the WCT information and complete the PCR-on procedure until a time indicated by the WCT.

Figure 29:
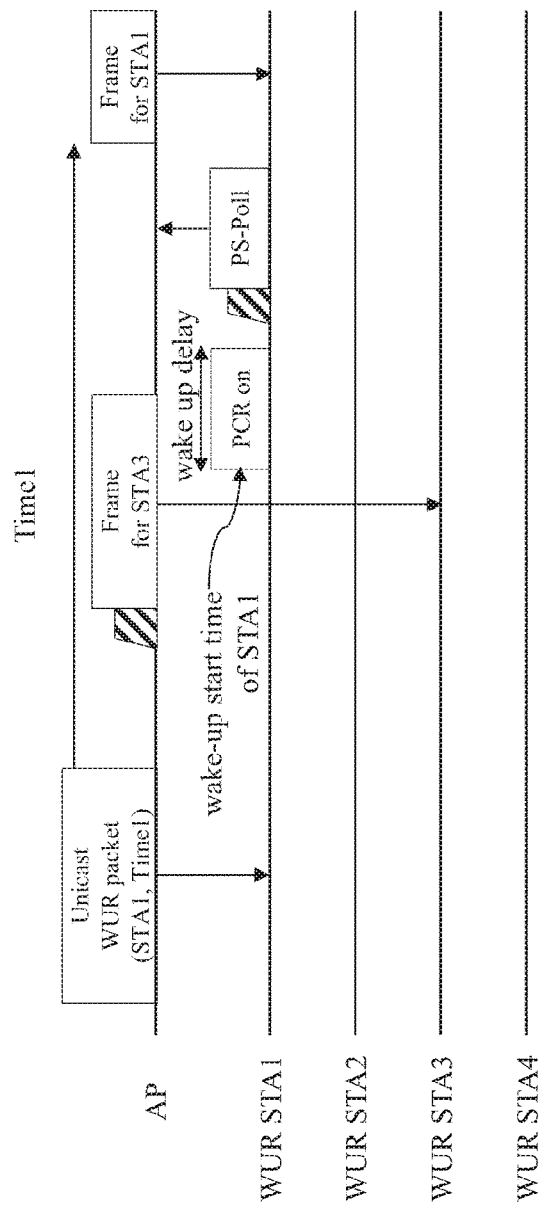
FIG. 29 illustrates transmission of an individual (e.g., unicast) WUR packet including time information according to an embodiment of the present invention.

FIG. 29 illustrates transmission of an individual (e.g., unicast) WUR packet including time information according to an embodiment of the present invention.

Referring to FIG. 29, an AP transmits a unicast WUR packet in order to wake up STA1 which is in a WUR mode. While WUR STA1 wakes up, if there is PCR data to be transmitted to STA3, the AP may determine a value of Time1 to be included in the unicast WUR packet transmitted to STA1, in consideration of the size of the PCR data to be transmitted to STA3. Information about Time1 may be, for example, a timing at which the AP starts to transmit a PCR frame to STA1. STA1 may calculate a PCR-on start time based on the information about Time1 and wake-up delay thereof and start to perform a PCR-on procedure at the PCR-on start time.

Figure 30:
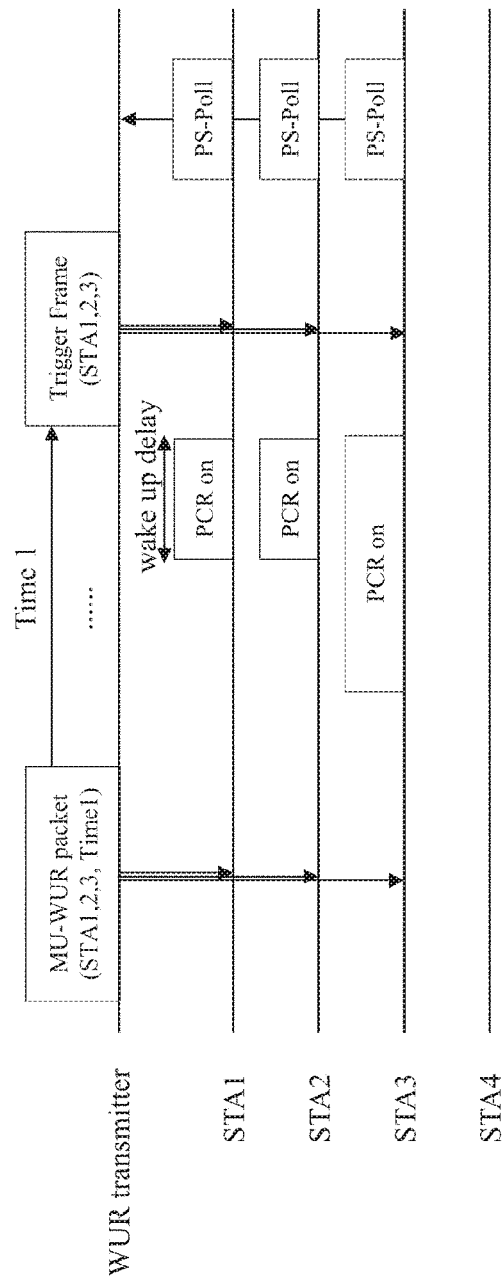
FIG. 30 illustrates an MU WUR packet transmission method according to an embodiment of the present invention.

FIG. 30 illustrates a Multi-User (MU) WUR packet transmission method according to an embodiment of the present invention.

For example, a WCT may be included in an MU WUR packet transmitted prior to MU polling transmission.

Referring to FIG. 30, a WUR transmitter (e.g., AP) may transmit the WUR packet and then transmit a trigger frame in order to poll STAs. The AP transmits information about a time at which the trigger frame starts to be transmitted in the WUR packet. An STA may calculate a start timing of a PCR-on procedure using the time information included in the WUR packet and start to perform the PCR-on procedure at the corresponding timing.

As another example, the AP may provide time information such as a WCT to a corresponding STA through a PCR before the STA enters a WUR mode. For example, the AP may transmit time information (e.g., TBTT, DTBTT, GBTT, WCT, scheduling time, Time1, etc.) for determining a timing at which the STA starts to perform the PCR-on procedure after receiving the broadcast WUR packet in the WUR mode in a WUR negotiation procedure performed through the PCR.

Figure 31:
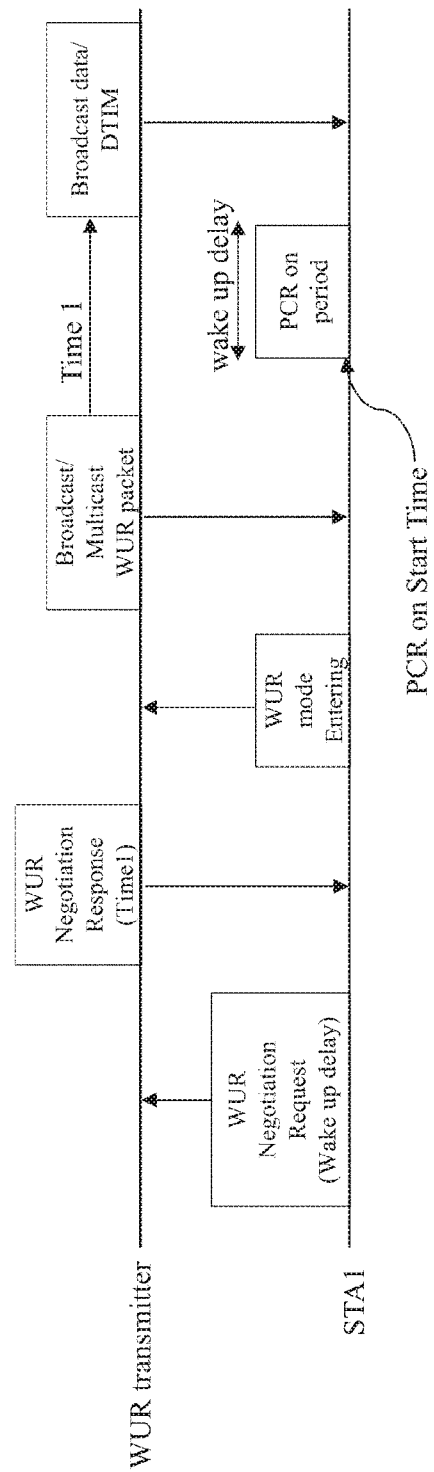
FIG. 31 illustrates a WUR negotiation procedure according to an embodiment of the present invention.

FIG. 31 illustrates a WUR negotiation procedure according to an embodiment of the present invention.

Referring to FIG. 31, STA1 may inform an AP of wake-up delay information thereof through a WUR negotiation request frame.

The AP may include information about Time1 in a WUR negotiation response frame transmitted as a response to the WUR negotiation request frame received from STA1. The information about Time1 may indicate at which timing broadcast/multicast data or a DTIM will be transmitted through a PCR after a WUR STA receives a broadcast/multicast WUR packet. As an example, when the STA informs the AP of wake-up delay information thereof through the WUR negotiation request frame, the AP may determine a wake-up frame transmission timing using the wake-up delay information.

STA1 may enter a WUR mode by transmitting a WUR mode entering frame indicating that STA1 enters the WUR mode. Upon receiving the broadcast WUR packet from the AP in the WUR mode, STA1 may determine a timing at which STA1 starts to perform a PCR-on procedure using the information about Time1 obtained prior to entering the WUR mode and start the PCR-on procedure at the corresponding timing. For example, STA1 may determine a timing at which the PCR-on procedure is started so that a PCR-on ending timing does not exceed a timing indicated by Time1.

Such time information may be provided through other procedures performed through the PCR in addition to a WUR negotiation request/response procedure. For example, the time information may be provided through a procedure (e.g., an association request/response) before WUR negotiation or through a procedure (e.g., WUR mode entering request/response exchange) after WUR negotiation.

Upon receiving the WUR packet, WUR mode STAs perform a procedure of turning on the PCR. The AP may include the following information about a wake-up reason in the WUR packet.

Wake-up reason field
  0—TIM beacon or next beacon reception
  1—DTIM beacon reception One wake-up reason may indicate that the TIM beacon or the next beacon should be received and another may indicate that the DTIM beacon should be received.

For example, when an STA needs to update system information included in a beacon after receiving the beacon, the AP may configure the wake-up reason as beacon reception. STAs may start to perform the PCR-on procedure at a next TBTT. Until the PCR-on procedure is started, the STAs may remain in the WUR mode or may be in a WUR mode off state in order to further reduce power consumption.

As another example, if the AP transmits the WUR packet in order to transmit group addressed BU(s), the AP may configure the wake-up reason as DTIM beacon reception. The STAs may start to perform the PCR-on procedure at a DTIM beacon transmission timing. Until the PCR-on procedure is started, the STAs may remain in the WUR mode or may be in the WUR mode off state in order to further reduce power consumption. Herein, the WUR packet may be, but is not limited to, the broadcast WUR packet.

The wake-up reason information may be implicitly transmitted to the STA through other fields instead of an explicit field.

Figure 32:
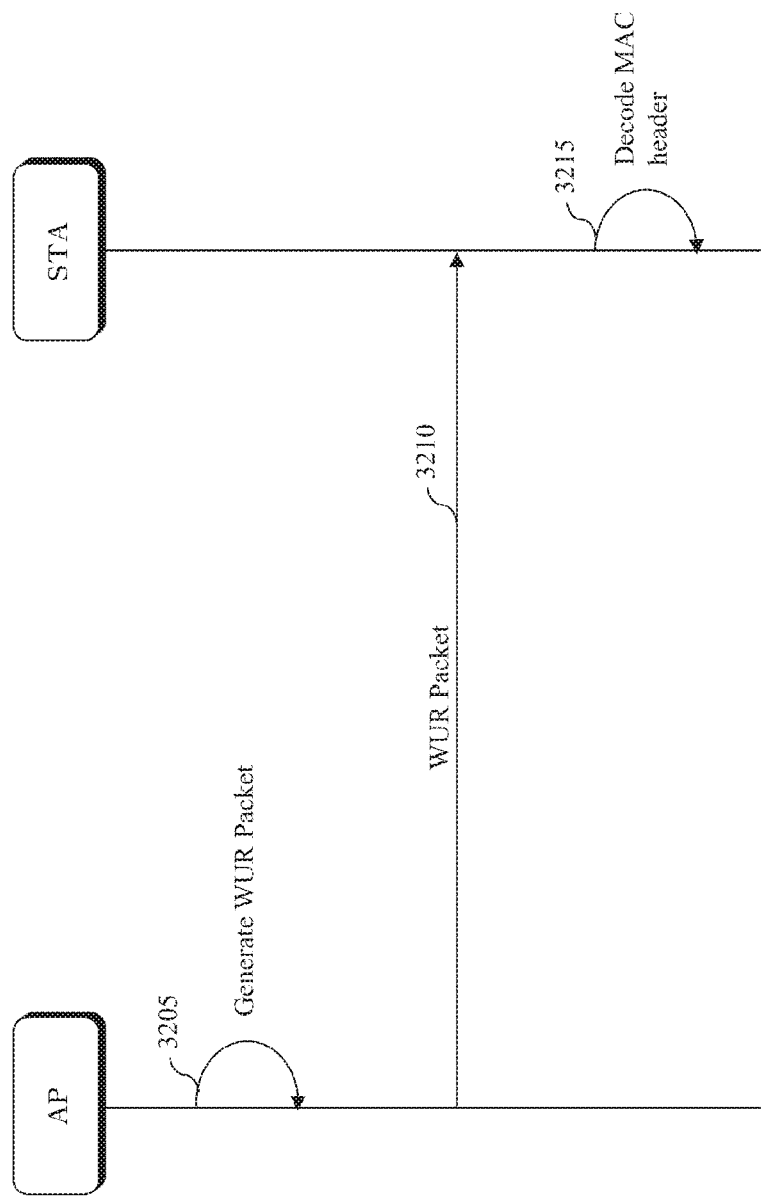
FIG. 32 illustrates a method of transmitting or receiving a WUR packet according to an embodiment of the present invention.

FIG. 32 illustrates a method of transmitting or receiving a WUR packet according to an embodiment of the present invention. A repetitive description given above may be omitted. Although only one STA is illustrated in FIG. 32 for convenience, a receiver of a WUR packet may be two or more STAs.

Referring to FIG. 32, an AP generates a WUR packet (3205). For example, the AP may configure a MAC header including at least two or more of type information, receiver address information, or transmitter address information of the WUR packet.

The AP transmits the WUR packet including the MAC header (3210).

Upon receiving the WUR packet, the STA decodes the MAC header (3215). For example, the STA acquires at least two or more of the type information, the receiver address information, or the transmitter address information of the WUR packet from the MAC header.

If the WUR packet is a broadcast WUR packet, the AP may omit the receiver address information from the MAC header and configure the transmitter address information. Whether an STA belonging to the AP should perform a PCR-on procedure after receiving the broadcast WUR packet may be indicated through the type information of the WUR packet.

If the WUR packet is a unicast WUR packet, the receiver address information configured as a WUR ID of the STA may be included in the MAC header.

If the WUR packet is a multicast WUR packet, the receiver address information configured as a group identifier (GID) of a corresponding STA group may be included in the MAC header. If the AP desires to transmit a group addressed frame through a PCR, the GID of the STA group may be configured as the receiver address information of the MAC header.

The transmitter address information may be omitted from the MAC header and the transmitter address information omitted from the MAC header may be indicated by another part of the WUR packet. The WUR packet may further include at least one of a WUR preamble, a frame body, or a Frame Check Sequence (FCS).

If the type information of the WUR packet indicates that the PCR-on procedure should be performed after the STA receives the broadcast WUR packet, the MAC header may further include information about a completion time of the PCR-on procedure.

The STA may determine a start time of the PCR-on procedure based on the completion time of the PCR-on procedure indicated by the MAC header of the WUR packet.

The AP may transmit a trigger frame or a group addressed frame through the PCR after the completion time of the PCR indicated by the MAC header of the WUR packet.

In the above description, although it is assumed that the WUR preamble is a sequence that provides synchronization for the WUR packet (i.e., WUR PPDU) in a WUR part, the present invention is not limited to the name and the WUR preamble of the WUR part may be referred to as a WUR synchronization field. WUR content of the WUR part may be referred to as a WUR data field. The PCR part may also be referred to as a non-WUR part.

If the term WUR preamble is defined in a wider meaning, the WUR preamble of a wider meaning may be the concept including a WUR synchronization field (i.e., a WUR preamble of a narrow meaning) of the WUR part and a non-WUR part.

For the WUR packet, a plurality of data rates may be supported. For example, data rates of 62.5 kbps and 250 kbps may be supported by the WUR packet. An actually used data rate may be indicated by a synchronization sequence of the WUR synchronization field. For example, when a first synchronization sequence is used, the data rate of 62.5 kbps may be used and, when a second synchronization sequence is used, the data rate of 250 kbps may be used. Thus, a plurality of WUR synchronization sequences may be supported.

Figure 33:
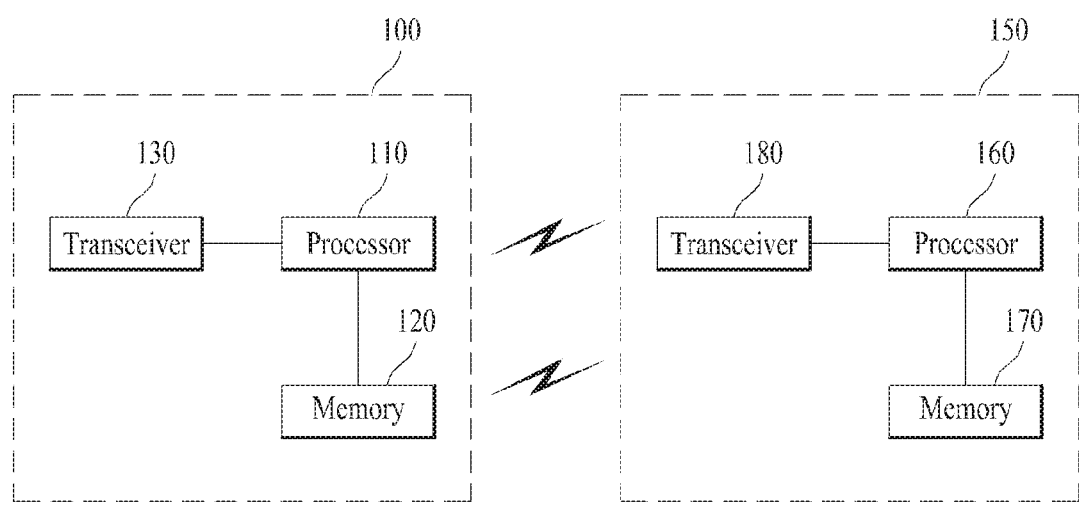
FIG. 33 is an explanatory diagram of an apparatus according to an embodiment of the present invention.

FIG. 33 is an explanatory diagram of an apparatus for implementing the above-described method.

A wireless apparatus 100 of FIG. 33 may correspond to the above-described specific STA and a wireless apparatus 150 of FIG. 33 may correspond to the above-described AP.

The STA 100 may include a processor 110, a memory 120, and a transceiver 130 and the AP 150 may include a processor 160, a memory 170, and a transceiver 180. The transceivers 130 and 180 may transmit/receive a wireless signal and may be implemented in a physical layer of IEEE 802.11/3GPP. The processors 110 and 160 are implemented in a physical layer and/or a MAC layer and are connected to the transceivers 130 and 180. The processors 110 and 160 may perform the above-mentioned UL MU scheduling procedure.

The processors 110 and 160 and/or the transceivers 130 and 180 may include an Application-Specific Integrated Circuit (ASIC), a chipset, a logical circuit, and/or a data processor. The memories 120 and 170 may include a Read-Only Memory (ROM), a Random Access Memory (RAM), a flash memory, a memory card, a storage medium, and/or a storage unit. If an embodiment is performed by software, the above-described method may be executed in the form of a module (e.g., a process or a function) performing the above-described function. The module may be stored in the memories 120 and 170 and executed by the processors 110 and 160. The memories 120 and 170 may be located at the interior or exterior of the processors 110 and 160 and may be connected to the processors 110 and 160 via known means.

The transceiver 130 of the STA may include a transmitter (not shown) and a receiver (not shown). The receiver of the STA may include a primary connectivity receiver for receiving a PCR (e.g., WLAN such as IEEE 802.11 a/b/g/n/ac/ax) signal and a WUR receiver for receiving a WUR signal. The transmitter of the STA may include a PCR transmitter for transmitting a PCR signal.

The transceiver 180 of the AP may include a transmitter (not shown) and a receiver (not shown). The transmitter of the AP may correspond to an OFDM transmitter. The AP may transmit a WUR payload by an OOK scheme by reusing an OFDM transmitter. For example, the AP may modulate the WUR payload by an OOK scheme through an OFDM transmitter as described above.

The detailed description of the exemplary embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be applied to various wireless communication systems including an IEEE 802.11 system.

What is claimed is:

1. A method of transmitting a Wake-Up Radio (WUR) packet by an Access Point (AP) in a Wireless Local Area Network (WLAN) system, the method comprising:
configuring a Media Access Control (MAC) header including at least two or more of type information, receiver address information, or transmitter address information of the WUR packet;
transmitting the WUR packet including the MAC header,
transmitting a beacon frame including at least one of a Traffic Indication Map (TIM) information or a Delivery Traffic Indication Map (DTIM) information, and
transmitting a group addressed broadcast unit based on the beacon frame including the DTIM information,
wherein, based on the WUR packet being a broadcast WUR packet, the receiver address information is omitted from the MAC header and the transmitter address information is included in the MAC header, and
wherein, based on the type information of the WUR packet indicating a specific type, a wake up procedure is performed by a station (STA) belonging to the AP after receiving the broadcast WUR packet and before receiving the beacon frame.

2. The method of claim 1, wherein, based on that the WUR packet is a unicast WUR packet, the receiver address information configured as a WUR identifier (ID) of a corresponding STA is included in the MAC header and,
wherein, based on that the WUR packet is a multicast WUR packet, the receiver address information configured as a Group ID (GID) of a corresponding STA group is included in the MAC header, upon configuring the MAC header.

3. The method of claim 2, wherein the transmitter address information is omitted from the MAC header and the transmitter address information omitted from the MAC header is indicated based on another part of the WUR packet.

4. The method of claim 3, wherein the WUR packet further includes at least one of a WUR preamble, a frame body, and a Frame Check Sequence (FCS).

5. The method of claim 2, wherein, based on that the AP transmits the group addressed broadcast unit through a Primary Connectivity Radio (PCR), the GID of the STA group is configured as the receiver address information of the MAC header.

6. The method of claim 1, wherein, based on that the type information of the WUR packet indicates the specific type, the MAC header further includes information about an end time of the PCR-on procedure.

7. The method of claim 6, further comprising:
transmitting a trigger frame or the group addressed broadcast unit through a Primary Connectivity Radio (PCR) after the end time of the wake up procedure indicated through the MAC header of the WUR packet.

8. A method of receiving a Wake-Up Radio (WUR) packet by a station (STA) in a Wireless Local Area Network (WLAN) system, the method comprising:
receiving the WUR packet including a Media Access Control (MAC) header;
acquiring at least two or more of type information, receiver address information, or transmitter address information of the WUR packet from the MAC header,
receiving a beacon frame including at least one of a Traffic Indication Map (TIM) information or a Delivery Traffic Indication Map (DTIM) information, and
receiving a group addressed broadcast unit based on the beacon frame including the DTIM information,
wherein, based on the WUR packet being a broadcast WUR packet, the receiver address information is omitted from the MAC header and the transmitter address information is included in the MAC header, and
wherein, based on the type information of the WUR packet indicating a specific type, a wake up procedure is performed by a station (STA) belonging to the AP after receiving the broadcast WUR packet and before receiving the beacon frame.

9. The method of claim 8, wherein, based on that the WUR packet is a unicast WUR packet, the receiver address information configured as a WUR identifier (ID) of a corresponding STA is included in the MAC header and,
wherein, based on that the WUR packet is a multicast WUR packet, the receiver address information configured as a Group ID (GID) of a corresponding STA group is included in the MAC header.

10. The method of claim 9, wherein the transmitter address information is omitted from the MAC header and the transmitter address information omitted from the MAC header is indicated based on another part of the WUR packet.

11. The method of claim 10, wherein the WUR packet further includes at least one of a WUR preamble, a frame body, and a Frame Check Sequence (FCS).

12. The method of claim 8, wherein, based on that the type information of the WUR packet indicates the specific type, the MAC header further includes information about an end time of the PCR-on procedure.

13. The method of claim 12, further comprising:
determining a start time of the wake up procedure based on the end time of the wake up procedure indicated through the MAC header of the WUR packet.

14. An Access Point (AP) for transmitting a Wake-Up Radio (WUR) packet, the AP comprising:
a transmitter; and
a processor operatively coupled to the transmitter, and configured to:
configure a Media Access Control (MAC) header including at least two or more of type information, receiver address information, or transmitter address information of the WUR packet; and
transmit the WUR packet including the MAC header according to control of the processor,
transmit a beacon frame including at least one of a Traffic Indication Map (TIM) information or a Delivery Traffic Indication Map (DTIM) information, and
transmit a group addressed broadcast unit based on the beacon frame including the DTIM information, wherein, based on the WUR packet being a broadcast WUR packet, the receiver address information is omitted from the MAC header and the transmitter address information is included in the MAC header, and wherein, based on the type information of the WUR packet indicating a specific type, a wake up processor is performed by a station (STA) belonging to the AP after receiving the broadcast WUR packet and before receiving the beacon frame.

15. A station (STA) for receiving a Wake-Up Radio (WUR) packet, the STA comprising:

a receiver; and a processor operatively coupled to the receiver, and configured to:

receive the WUR packet including a Media Access Control (MAC) header; and acquire at least two or more of type information, receiver address information, or transmitter address information of the WUR packet from the MAC header, receive a beacon frame including at least one of a Traffic Indication Map (TIM) information or a Delivery Traffic Indication Map (DTIM) information, and receive a group addressed broadcast unit based on the beacon frame including the DTIM information, wherein, based on the WUR packet being a broadcast WUR packet, the receiver address information is omitted from the MAC header and the transmitter address information is included in the MAC header , and wherein, based on the type information of the WUR packet indicating a specific type, a wake up procedure is performed by a station (STA) belonging to the AP after receiving the broadcast WUR packet and before receiving the beacon frame.

\* \* \* \* \*